United States Patent
Venkatesan et al.

(10) Patent No.: US 11,249,851 B2
(45) Date of Patent: Feb. 15, 2022

(54) CREATING SNAPSHOTS OF A STORAGE VOLUME IN A DISTRIBUTED STORAGE SYSTEM

(71) Applicant: Robin Systems, Inc., San Jose, CA (US)

(72) Inventors: Dhanashankar Venkatesan, San Jose, CA (US); Jagadish Kumar Mukku, San Jose, CA (US); Ripulkumar Hemantbhai Patel, Fremont, CA (US)

(73) Assignee: ROBIN SYSTEMS, INC., San Jose, CA (US)

( * ) Notice: Subject to any disclaimer, the term of this patent is extended or adjusted under 35 U.S.C. 154(b) by 118 days.

(21) Appl. No.: 16/562,062

(22) Filed: Sep. 5, 2019

(65) Prior Publication Data
US 2021/0073079 A1    Mar. 11, 2021

(51) Int. Cl.
*G06F 11/14* (2006.01)
*G06F 3/06* (2006.01)

(52) U.S. Cl.
CPC .......... *G06F 11/1448* (2013.01); *G06F 3/064* (2013.01); *G06F 3/0619* (2013.01); *G06F 3/0683* (2013.01); *G06F 11/1469* (2013.01); *G06F 2201/84* (2013.01)

(58) Field of Classification Search
CPC .. G06F 11/1448; G06F 11/1469; G06F 3/064; G06F 3/0683; G06F 3/0619; G06F 2201/84
See application file for complete search history.

(56) References Cited

U.S. PATENT DOCUMENTS

| | | | |
|---|---|---|---|
| 3,715,573 | A | 2/1973 | Vogelsberg |
| 4,310,883 | A | 1/1982 | Clifton |
| 5,602,993 | A | 2/1997 | Stromberg |
| 5,680,513 | A | 10/1997 | Hyland |
| 5,796,290 | A | 8/1998 | Takahashi |
| 6,014,669 | A | 1/2000 | Slaughter |

(Continued)

FOREIGN PATENT DOCUMENTS

WO    WO2017008675    1/2017

OTHER PUBLICATIONS

Segment map, Feb. 4, 2019.

(Continued)

*Primary Examiner* — Francisco A Grullon
(74) *Attorney, Agent, or Firm* — David R. Stevens; Stevens Law Group

(57) ABSTRACT

A new snapshot of a storage volume is created by instructing computing nodes to suppress write requests. Storage nodes create a new snapshot for the storage volume by allocating a new segment to the new snapshot and finalizes and performs garbage collection with respect to segments allocated to the previous snapshot. Subsequent write requests to the storage volume are then performed on the segments allocated to the new snapshot. A segment maps segments to a particular snapshot and metadata stored in the segment indicates storage volume addresses of data written to the segment. The snapshots may be represented by a storage manager in a hierarchy that identifies an ordering of snapshots and branches to clone snapshots. A non-snapshot volume may be converted to a snapshot volume at any point after creation.

19 Claims, 13 Drawing Sheets

(56) References Cited

U.S. PATENT DOCUMENTS

| | | |
|---|---|---|
| 6,052,797 A | 4/2000 | Ofek |
| 6,119,214 A * | 9/2000 | Dirks .................. G06F 12/10 |
| | | 711/159 |
| 6,157,963 A | 12/2000 | Courtright, II |
| 6,161,191 A | 12/2000 | Slaughter |
| 6,298,478 B1 | 10/2001 | Nally |
| 6,301,707 B1 | 10/2001 | Carroll |
| 6,311,193 B1 | 10/2001 | Sekido |
| 6,851,034 B2 | 2/2005 | Challenger |
| 6,886,160 B1 | 4/2005 | Lee |
| 6,895,485 B1 | 5/2005 | Dekoning |
| 6,957,221 B1 | 10/2005 | Hart |
| 7,096,465 B1 | 8/2006 | Dardinski |
| 7,111,055 B2 | 9/2006 | Falkner |
| 7,171,659 B2 | 1/2007 | Becker |
| 7,246,351 B2 | 7/2007 | Bloch |
| 7,305,671 B2 | 12/2007 | Davidov |
| 7,461,374 B1 | 12/2008 | Balint |
| 7,467,268 B2 | 12/2008 | Lindemann |
| 7,535,854 B2 | 5/2009 | Luo |
| 7,590,620 B1 | 9/2009 | Pike |
| 7,698,698 B2 | 4/2010 | Skan |
| 7,721,283 B2 | 5/2010 | Kovachka |
| 7,734,859 B2 | 6/2010 | Daniel |
| 7,738,457 B2 | 6/2010 | Nordmark |
| 7,779,091 B2 | 8/2010 | Wilkinson |
| 7,797,693 B1 | 9/2010 | Gustafson |
| 7,984,485 B1 | 7/2011 | Rao |
| 8,037,471 B2 | 10/2011 | Keller |
| 8,046,450 B1 | 10/2011 | Schloss |
| 8,060,522 B2 | 11/2011 | Birdwell |
| 8,121,874 B1 | 2/2012 | Guheen |
| 8,171,141 B1 | 5/2012 | Offer |
| 8,219,821 B2 | 7/2012 | Zimmels |
| 8,250,033 B1 | 8/2012 | De Souter |
| 8,261,295 B1 | 9/2012 | Risbood |
| 8,326,883 B2 | 12/2012 | Pizzorni |
| 8,392,498 B2 | 3/2013 | Berg |
| 8,429,346 B1 | 4/2013 | Chen |
| 8,464,241 B2 | 6/2013 | Hayton |
| 8,505,003 B2 | 8/2013 | Bowen |
| 8,527,544 B1 | 9/2013 | Colgrove |
| 8,589,447 B1 | 11/2013 | Grunwald et al. |
| 8,601,467 B2 | 12/2013 | Hofhansl |
| 8,620,973 B1 * | 12/2013 | Veeraswamy ......... G06F 16/128 |
| | | 707/822 |
| 8,666,933 B2 | 3/2014 | Pizzorni |
| 8,745,003 B1 | 6/2014 | Patterson |
| 8,775,751 B1 | 7/2014 | Pendharkar |
| 8,782,632 B1 | 7/2014 | Chigurapati |
| 8,788,634 B2 | 7/2014 | Krig |
| 8,832,324 B1 | 9/2014 | Hodges |
| 8,886,806 B2 | 11/2014 | Tung |
| 8,909,885 B2 | 12/2014 | Corbett |
| 8,954,383 B1 | 2/2015 | Vempati |
| 8,954,568 B2 | 2/2015 | Krishnan |
| 8,966,198 B1 | 2/2015 | Harris |
| 9,009,542 B1 | 4/2015 | Marr |
| 9,134,992 B2 | 9/2015 | Wong |
| 9,146,769 B1 | 9/2015 | Shankar |
| 9,148,465 B2 | 9/2015 | Gambardella |
| 9,152,337 B2 | 10/2015 | Kono |
| 9,167,028 B1 | 10/2015 | Bansal |
| 9,280,591 B1 | 3/2016 | Kharatishvili |
| 9,330,155 B1 | 5/2016 | Bono |
| 9,336,060 B2 | 5/2016 | Nori |
| 9,342,444 B2 | 5/2016 | Minckler |
| 9,367,301 B1 | 6/2016 | Serrano |
| 9,390,128 B1 | 7/2016 | Seetala |
| 9,436,693 B1 | 9/2016 | Lockhart |
| 9,514,160 B2 | 12/2016 | Song |
| 9,521,198 B1 | 12/2016 | Agarwala |
| 9,569,274 B2 | 2/2017 | Tarta |
| 9,569,480 B2 | 2/2017 | Provencher |
| 9,590,872 B1 | 3/2017 | Jagtap |
| 9,600,193 B2 | 3/2017 | Ahrens |
| 9,613,119 B1 | 4/2017 | Aron |
| 9,619,389 B1 | 4/2017 | Roug |
| 9,635,132 B1 | 4/2017 | Lin |
| 9,667,470 B2 | 5/2017 | Prathipati |
| 9,733,992 B1 | 8/2017 | Poeluev |
| 9,747,096 B2 | 8/2017 | Searle |
| 9,870,366 B1 * | 1/2018 | Duan .................. G06F 3/0608 |
| 9,880,933 B1 | 1/2018 | Gupta |
| 9,892,265 B1 | 2/2018 | Tripathy |
| 9,929,916 B1 | 3/2018 | Subramanian |
| 9,998,955 B1 | 6/2018 | MacCarthaigh |
| 10,019,459 B1 | 7/2018 | Agarwala |
| 10,042,628 B2 | 8/2018 | Thompson |
| 10,061,520 B1 | 8/2018 | Zhao |
| 10,133,619 B1 | 11/2018 | Nagpal |
| 10,169,169 B1 | 1/2019 | Shaikh |
| 10,191,778 B1 | 1/2019 | Yang |
| 10,241,774 B2 | 3/2019 | Spivak |
| 10,282,229 B2 | 5/2019 | Wagner |
| 10,339,112 B1 | 7/2019 | Ranade |
| 10,353,634 B1 | 7/2019 | Greenwood |
| 10,430,434 B2 | 10/2019 | Sun |
| 10,657,119 B1 | 5/2020 | Acheson |
| 10,956,246 B1 | 3/2021 | Bagde |
| 2002/0141390 A1 | 10/2002 | Fangman |
| 2004/0010716 A1 | 1/2004 | Childress |
| 2004/0153703 A1 | 8/2004 | Vigue |
| 2004/0221125 A1 | 11/2004 | Ananthanarayanan |
| 2005/0065986 A1 | 3/2005 | Bixby |
| 2005/0216895 A1 | 9/2005 | Tran |
| 2005/0256948 A1 | 11/2005 | Hu |
| 2006/0025908 A1 | 2/2006 | Rachlin |
| 2006/0053357 A1 | 3/2006 | Rajski |
| 2006/0085674 A1 | 4/2006 | Ananthamurthy |
| 2006/0259686 A1 | 11/2006 | Sonobe |
| 2007/0006015 A1 | 1/2007 | Rao |
| 2007/0016786 A1 | 1/2007 | Waltermann |
| 2007/0067583 A1 | 3/2007 | Zohar |
| 2007/0165625 A1 | 7/2007 | Eisner |
| 2007/0260842 A1 | 11/2007 | Faibish |
| 2007/0277056 A1 | 11/2007 | Varadarajan |
| 2007/0288791 A1 | 12/2007 | Allen |
| 2008/0010421 A1 | 1/2008 | Chen |
| 2008/0068899 A1 | 3/2008 | Ogihara |
| 2008/0189468 A1 | 8/2008 | Schmidt |
| 2008/0235544 A1 | 9/2008 | Lai |
| 2008/0256141 A1 | 10/2008 | Wayda |
| 2008/0256143 A1 | 10/2008 | Reddy |
| 2008/0256167 A1 | 10/2008 | Branson |
| 2008/0263400 A1 | 10/2008 | Waters |
| 2008/0270592 A1 | 10/2008 | Choudhary |
| 2009/0144497 A1 | 6/2009 | Withers |
| 2009/0172335 A1 | 7/2009 | Kulkarni |
| 2009/0240809 A1 | 9/2009 | La Frese |
| 2009/0254701 A1 | 10/2009 | Kurokawa |
| 2009/0307249 A1 | 12/2009 | Koifman |
| 2010/0100251 A1 | 4/2010 | Chao |
| 2010/0161941 A1 | 6/2010 | Vyshetsky |
| 2010/0162233 A1 | 6/2010 | Ku |
| 2010/0211815 A1 | 8/2010 | Mankovskii |
| 2010/0274984 A1 | 10/2010 | Inomata |
| 2010/0299309 A1 | 11/2010 | Maki |
| 2010/0306495 A1 | 12/2010 | Kumano |
| 2010/0332730 A1 | 12/2010 | Royer |
| 2011/0083126 A1 | 4/2011 | Bhakta |
| 2011/0119664 A1 | 5/2011 | Kimura |
| 2011/0161291 A1 | 6/2011 | Taleck |
| 2011/0188506 A1 | 8/2011 | Arribas |
| 2011/0208928 A1 | 8/2011 | Chandra |
| 2011/0239227 A1 | 9/2011 | Schaefer |
| 2011/0246420 A1 | 10/2011 | Wang |
| 2011/0276951 A1 | 11/2011 | Jain |
| 2012/0005557 A1 | 1/2012 | Mardiks |
| 2012/0016845 A1 | 1/2012 | Bates |
| 2012/0066449 A1 | 3/2012 | Colgrove |
| 2012/0102369 A1 | 4/2012 | Hiltunen |
| 2012/0137059 A1 | 5/2012 | Yang |
| 2012/0216052 A1 | 8/2012 | Dunn |

(56) References Cited

U.S. PATENT DOCUMENTS

| | | |
|---|---|---|
| 2012/0226667 A1 | 9/2012 | Volvovski |
| 2012/0240012 A1 | 9/2012 | Weathers |
| 2012/0259819 A1 | 10/2012 | Patwardhan |
| 2012/0265976 A1 | 10/2012 | Spiers |
| 2012/0303348 A1 | 11/2012 | Lu |
| 2012/0311671 A1 | 12/2012 | Wood |
| 2012/0331113 A1 | 12/2012 | Jain |
| 2013/0054552 A1 | 2/2013 | Hawkins |
| 2013/0054932 A1 | 2/2013 | Acharya |
| 2013/0080723 A1 | 3/2013 | Sawa |
| 2013/0254521 A1 | 9/2013 | Bealkowski |
| 2013/0282662 A1 | 10/2013 | Kumarasamy |
| 2013/0332688 A1* | 12/2013 | Corbett ............... G06F 3/064 711/162 |
| 2013/0339659 A1 | 12/2013 | Bybell |
| 2013/0346618 A1 | 12/2013 | Holkkola |
| 2013/0346709 A1 | 12/2013 | Wang |
| 2014/0006465 A1 | 1/2014 | Davis |
| 2014/0047263 A1 | 2/2014 | Coatney |
| 2014/0047341 A1 | 2/2014 | Breternitz |
| 2014/0047342 A1 | 2/2014 | Breternitz |
| 2014/0058871 A1 | 2/2014 | Marr |
| 2014/0059527 A1 | 2/2014 | Gagliardi |
| 2014/0059528 A1 | 2/2014 | Gagliardi |
| 2014/0089265 A1 | 3/2014 | Talagala |
| 2014/0108483 A1 | 4/2014 | Tarta |
| 2014/0130040 A1 | 5/2014 | Lemanski |
| 2014/0149696 A1 | 5/2014 | Frenkel |
| 2014/0195847 A1 | 7/2014 | Webman |
| 2014/0245319 A1 | 8/2014 | Fellows |
| 2014/0281449 A1 | 9/2014 | Christopher |
| 2014/0282596 A1 | 9/2014 | Bourbonnais |
| 2015/0046644 A1 | 2/2015 | Karp |
| 2015/0067031 A1 | 3/2015 | Acharya |
| 2015/0074358 A1 | 3/2015 | Flinsbaugh |
| 2015/0112951 A1 | 4/2015 | Narayanamurthy et al. |
| 2015/0134857 A1 | 5/2015 | Hahn |
| 2015/0149605 A1 | 5/2015 | de la Iglesia |
| 2015/0186217 A1* | 7/2015 | Eslami Sarab ...... G06F 11/1435 707/649 |
| 2015/0278333 A1 | 10/2015 | Hirose |
| 2015/0317212 A1 | 11/2015 | Lee |
| 2015/0319160 A1 | 11/2015 | Ferguson |
| 2015/0326481 A1 | 11/2015 | Rector |
| 2015/0379287 A1 | 12/2015 | Mathur |
| 2016/0011816 A1 | 1/2016 | Aizman |
| 2016/0026667 A1 | 1/2016 | Mukherjee |
| 2016/0042005 A1 | 2/2016 | Liu |
| 2016/0124775 A1 | 5/2016 | Ashtiani |
| 2016/0197995 A1 | 7/2016 | Lu |
| 2016/0239412 A1 | 8/2016 | Wada |
| 2016/0259597 A1 | 9/2016 | Worley |
| 2016/0283261 A1 | 9/2016 | Nakatsu |
| 2016/0357456 A1 | 12/2016 | Iwasaki |
| 2016/0357548 A1 | 12/2016 | Stanton |
| 2016/0373327 A1 | 12/2016 | Degioanni |
| 2017/0034023 A1 | 2/2017 | Nickolov |
| 2017/0060710 A1 | 3/2017 | Ramani |
| 2017/0060975 A1 | 3/2017 | Akyureklier |
| 2017/0139645 A1 | 5/2017 | Byun |
| 2017/0149843 A1 | 5/2017 | Amulothu |
| 2017/0168903 A1 | 6/2017 | Dornemann |
| 2017/0192889 A1 | 7/2017 | Sato |
| 2017/0214550 A1 | 7/2017 | Kumar |
| 2017/0235649 A1 | 8/2017 | Shah |
| 2017/0242617 A1 | 8/2017 | Walsh |
| 2017/0242719 A1 | 8/2017 | Tsirkin |
| 2017/0244557 A1 | 8/2017 | Riel |
| 2017/0244787 A1 | 8/2017 | Rangasamy |
| 2017/0293450 A1 | 10/2017 | Battaje |
| 2017/0322954 A1 | 11/2017 | Horowitz |
| 2017/0337492 A1 | 11/2017 | Chen |
| 2017/0371551 A1 | 12/2017 | Sachdev |
| 2018/0006896 A1 | 1/2018 | MacNamara |
| 2018/0024889 A1 | 1/2018 | Verma |
| 2018/0046553 A1 | 2/2018 | Okamoto |
| 2018/0082053 A1 | 3/2018 | Brown |
| 2018/0107419 A1* | 4/2018 | Sachdev ................ G06F 3/065 |
| 2018/0113625 A1 | 4/2018 | Sancheti |
| 2018/0113770 A1 | 4/2018 | Hasanov |
| 2018/0136931 A1 | 5/2018 | Hendrich |
| 2018/0137306 A1 | 5/2018 | Brady |
| 2018/0150306 A1 | 5/2018 | Govindaraju |
| 2018/0159745 A1 | 6/2018 | Byers |
| 2018/0165170 A1 | 6/2018 | Hegdal |
| 2018/0218000 A1 | 8/2018 | Setty |
| 2018/0225140 A1 | 8/2018 | Titus |
| 2018/0225216 A1 | 8/2018 | Filippo |
| 2018/0246670 A1* | 8/2018 | Baptist ................ G06F 3/0659 |
| 2018/0246745 A1 | 8/2018 | Aronovich |
| 2018/0247064 A1 | 8/2018 | Aronovich |
| 2018/0276215 A1 | 9/2018 | Chiba |
| 2018/0285164 A1 | 10/2018 | Hu |
| 2018/0285223 A1 | 10/2018 | McBride |
| 2018/0285353 A1 | 10/2018 | Ramohalli |
| 2018/0287883 A1 | 10/2018 | Joshi |
| 2018/0302335 A1 | 10/2018 | Gao |
| 2018/0329981 A1 | 11/2018 | Gupte |
| 2018/0364917 A1 | 12/2018 | Ki |
| 2018/0375728 A1 | 12/2018 | Gangil |
| 2019/0004704 A1 | 1/2019 | Rathi |
| 2019/0065061 A1 | 2/2019 | Kim |
| 2019/0065323 A1 | 2/2019 | Dhamdhere |
| 2019/0073132 A1 | 3/2019 | Zhou |
| 2019/0073372 A1 | 3/2019 | Venkatesan |
| 2019/0079928 A1 | 3/2019 | Kumar |
| 2019/0089651 A1 | 3/2019 | Pignataro et al. |
| 2019/0102226 A1 | 4/2019 | Caldato |
| 2019/0109756 A1 | 4/2019 | Abulebdeh |
| 2019/0116690 A1 | 4/2019 | Chen |
| 2019/0148932 A1 | 5/2019 | Benesch |
| 2019/0156023 A1 | 5/2019 | Gerebe |
| 2019/0163460 A1 | 5/2019 | Kludy |
| 2019/0188094 A1 | 6/2019 | Ramamoorthi |
| 2019/0190803 A1 | 6/2019 | Joshi |
| 2019/0199601 A1 | 6/2019 | Lynar |
| 2019/0213085 A1 | 7/2019 | Alluboyina |
| 2019/0215313 A1 | 7/2019 | Doshi |
| 2019/0220266 A1 | 7/2019 | Doshi |
| 2019/0220315 A1 | 7/2019 | Vallala |
| 2019/0235895 A1 | 8/2019 | Ovesea |
| 2019/0250849 A1 | 8/2019 | Compton |
| 2019/0272205 A1 | 9/2019 | Jiang |
| 2019/0278624 A1 | 9/2019 | Bade |
| 2019/0324666 A1 | 10/2019 | Kusters |
| 2019/0334727 A1 | 10/2019 | Kaufman |
| 2019/0361748 A1 | 11/2019 | Walters |
| 2019/0369273 A1 | 12/2019 | Liu |
| 2019/0370018 A1 | 12/2019 | Kirkpatrick |
| 2020/0019414 A1 | 1/2020 | Byard |
| 2020/0026635 A1 | 1/2020 | Gaber |
| 2020/0034193 A1 | 1/2020 | Jayaram |
| 2020/0034254 A1 | 1/2020 | Natanzon |
| 2020/0065406 A1 | 2/2020 | Ippatapu |
| 2020/0073586 A1* | 3/2020 | Kurata ................ G06F 3/0652 |
| 2020/0083909 A1 | 3/2020 | Kusters |
| 2020/0150977 A1 | 5/2020 | Wang |
| 2020/0162330 A1 | 5/2020 | Vadapalli |
| 2020/0257519 A1 | 8/2020 | Shen |
| 2020/0310774 A1 | 10/2020 | Zhu |
| 2020/0310915 A1 | 10/2020 | Alluboyina |
| 2020/0356537 A1 | 11/2020 | Sun |
| 2020/0412625 A1 | 12/2020 | Bagarolo |
| 2021/0029000 A1 | 1/2021 | Mordani |
| 2021/0042151 A1 | 2/2021 | Muller |
| 2021/0064536 A1 | 3/2021 | Palmer |
| 2021/0067607 A1 | 3/2021 | Gardner |
| 2021/0126839 A1 | 4/2021 | Rudrachar |
| 2021/0141655 A1 | 5/2021 | Gamage |
| 2021/0157622 A1 | 5/2021 | Ananthapur |
| 2021/0168034 A1 | 6/2021 | Qian |

(56) References Cited

OTHER PUBLICATIONS

Implementing time critical functionalities with a distributed adaptive container architecture, Stankovski, Nov. 2016.
Segment map, Google, Feb. 4, 2019.
Fast and Secure Append-Only storage with Infinite Capacity, Zheng, Aug. 27, 2003.
User Mode and Kernel Mode, Microsoft, Apr. 19, 2017.
Precise memory leak detection for java software using container profiling, Xu, Jul. 2013.
Mogi et al., "Dynamic Parity Stripe Reorganizations for Raid5 Disk Arrays," 1994, IEEE, pp. 17-26.
Syed et al., "The Container Manager Pattern", ACM, pp. 1-9 (Year 2017).
Rehmann et al., "Performance of Containerized Database Management Systems", ACM, pp. 1-6 (Year 2018).
Awada et al., "Improving Resource Efficiency of Container-instance Clusters on Clouds", IEEE, pp. 929-934 (Year 2017).
Stankovski et al., "Implementing Time-Critical Functionalities with a Distributed Adaptive Container Architecture", ACM, pp. 1-5 (Year 2016).
Dhakate et al., "Distributed Cloud Monitoring Using Docker as Next Generation Container Virtualization Technology" IEEE, pp. 1-5 (Year 2015).
Crameri et al., "Staged Deployment in Mirage, an Integrated Software Upgrade Testing and Distribution System", ACM, pp. 221-236 (Year: 2007).
Cosmo et al., "Packages Upgrades in FOSS Distributions: Details and Challenges", AC 2008).
Burg et al., "Atomic Upgrading of Distributed Systems", ACM, pp. 1-5 (Year: 2008).
Souer et al., "Component Based Architecture forWeb Content Management: Runtime Deployable Web Manager Component Bundles", IEEE, pp. 366-369 (Year: 2008).
Weingartner et al., "A distributed autonomic management framework for cloud computing orchestration." In 2016 IEEE World Congress on Services (Year: 2016).

* cited by examiner

CREATING SNAPSHOTS OF A STORAGE VOLUME IN A DISTRIBUTED STORAGE SYSTEM

BACKGROUND

Field of the Invention

This invention relates to creating snapshots of a storage volume.

Background of the Invention

In many contexts, it is helpful to be able to return a database to an original state or some intermediate state. In this manner, changes to software or other database configuration parameters may be tested without fear of corrupting critical data.

The systems and methods disclosed herein provide an improved approach for creating snapshots of a database and returning to a previous snapshot.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
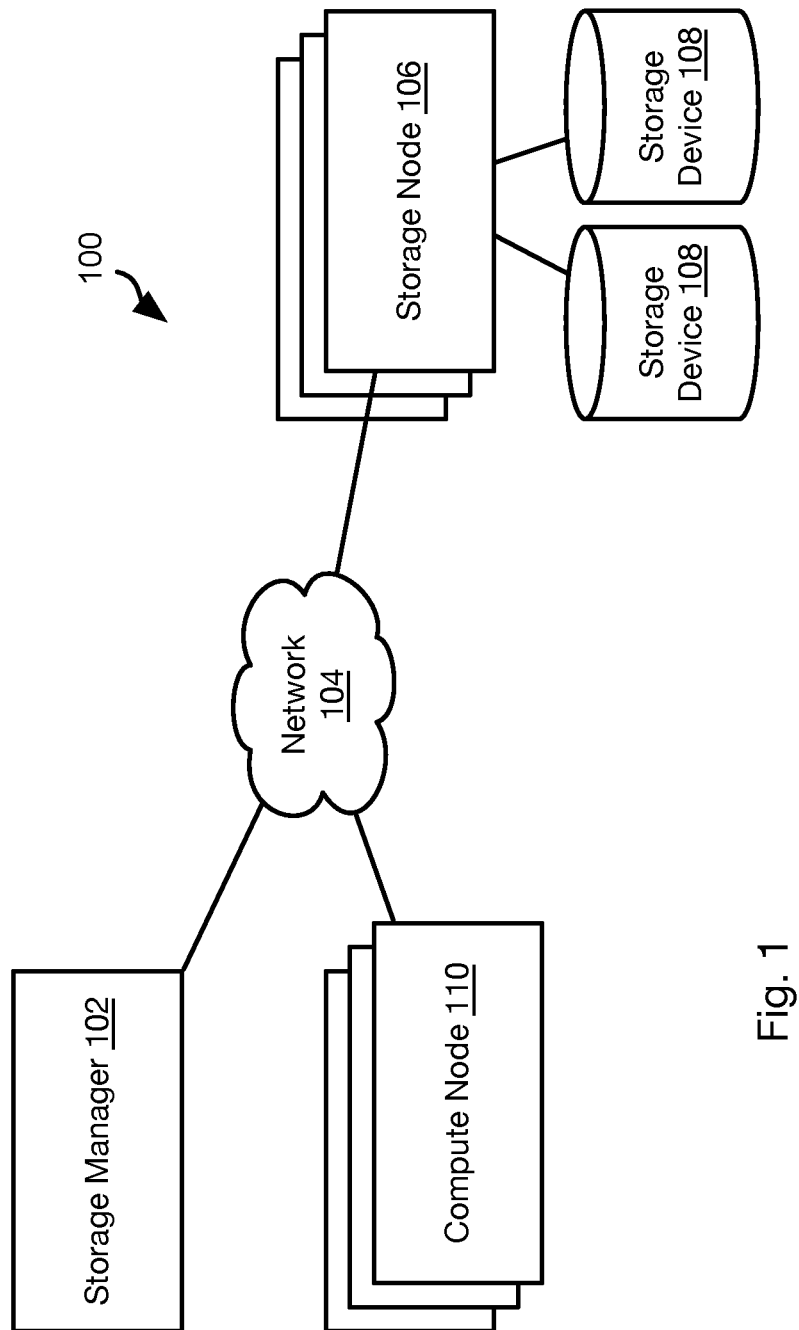
FIG. 1 is a schematic block diagram of a network environment for implementing methods in accordance with an embodiment of the present invention.

Referring to FIG. 1, the methods disclosed herein may be performed using the illustrated network environment 100. The network environment 100 includes a storage manager 102 that coordinates the creation of snapshots of storage volumes and maintains records of where snapshots are stored within the network environment 100. In particular, the storage manager 102 may be connected by way of a network 104 to one or more storage nodes 106, each storage node having one or more storage devices 108, e.g. hard disk drives, flash memory, or other persistent or transitory memory. The network 104 may be a local area network (LAN), wide area network (WAN), or any other type of network including wired, fireless, fiber optic, or any other type of network connections.

One or more compute nodes 110 are also coupled to the network 104 and host user applications that generate read and write requests with respect to storage volumes managed by the storage manager 102 and stored within the memory devices 108 of the storage nodes 108.

The methods disclosed herein ascribe certain functions to the storage manager 102, storage nodes 106, and compute node 110. The methods disclosed herein are particularly useful for large scale deployment including large amounts of data distributed over many storage nodes 106 and accessed by many compute nodes 110. However, the methods disclosed herein may also be implemented using a single computer implementing the functions ascribed herein to some or all of the storage manager 102, storage nodes 106, and compute node 110.

Figure 2:
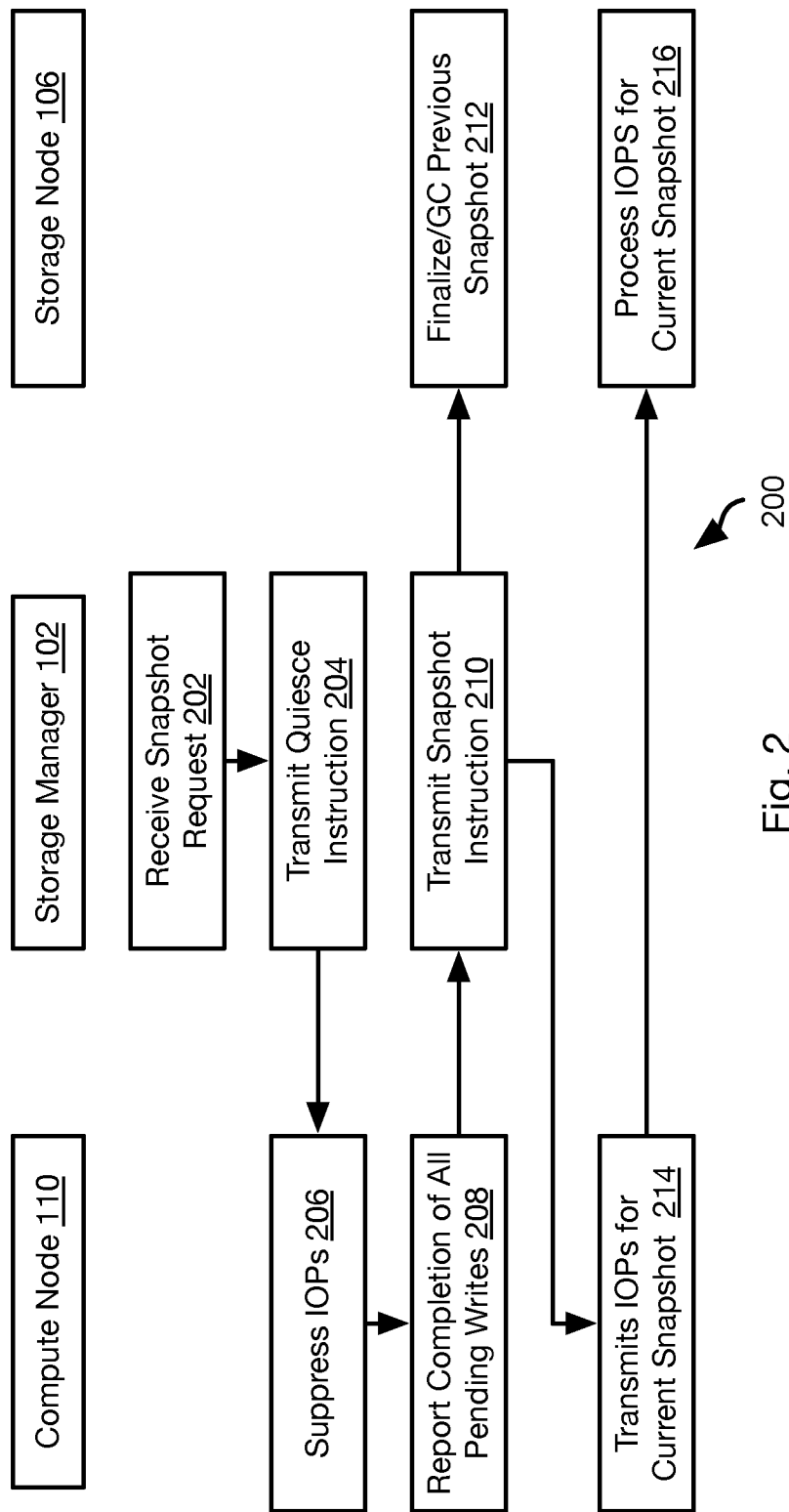
FIG. 2 is a process flow diagram of a method for coordinating snapshot creation with compute nodes and storage nodes in accordance with an embodiment of the present invention.

Referring to FIG. 2, the illustrated method 200 may be performed in order to invoke the creation of a new snapshot. Other than a current snapshot, which is still subject to change, a snapshot captures the state of a storage volume at a moment in time and is preferably not altered in response to subsequent writes to the storage volume.

The method 200 includes receiving, by the storage manager 102 a request to create a new snapshot for a storage volume. A storage volume as referred to herein may be a virtual storage volume that may divided into individual slices. For example, storage volumes as described herein may be 1 TB and be divided into 1 GB slices. In general, a slice and its snapshot are stored on a single storage node 106, whereas a storage volume may have the slices thereof stored by multiple storage nodes 106.

The request received at step 202 may be received from a human operator or generated automatically, such as according to backup scheduler executing on the storage manager 102 or some other computing device. The subsequent steps of the method 200 may be executed in response to receiving 202 the request The method 200 may include transmitting 204 a quiesce instruction to all compute nodes 110 that are associated with the storage volume. For example, all compute nodes 110 that have pending write requests to the storage volume. In some embodiments, the storage manager 102 may store a mapping of compute nodes 110 to a particular storage volume used by the compute nodes 110. Accordingly, step 204 may include sending 204 the quiesce instruction to all of these compute nodes. Alternatively, the instruction may be transmitted 204 to all compute nodes 110 and include an identifier of the storage volume. The compute nodes 110 may then suppress any write instructions referencing that storage volume.

The quiesce instruction instructs the compute nodes 110 that receive it to suppress 206 transmitting write requests to the storage nodes 106 for the storage volume referenced by the quiesce instruction. The quiesce instruction may further cause the compute nodes 110 that receive it to report 208 to the storage manager 102 when no write requests are pending for that storage volume, i.e. all write requests issued to one or more storage nodes 106 and referencing slices of that storage volume have been acknowledged by the one or more storage nodes 106.

In response to receiving the report of step 208 from one or more compute nodes, e.g. all compute nodes that are mapped to the storage node that is the subject of the snapshot request of step 202, the storage manager 102 transmits 210 an instruction to the storage nodes 106 associated with the storage volume to create a new snapshot of that storage volume. Step 210 may further include transmitting 210 an instruction to the compute nodes 110 associated with the storage volume to commence issuing write commands to the storage nodes 106 associated with the storage volume. In some embodiments, the instruction of step 110 may include an identifier of the new snapshot. Accordingly, subsequent input/output operations (IOPs) transmitted 214 from the compute nodes may reference that snapshot identifier. Likewise, the storage node 106 may associate the snapshot identifier with data subsequently written to the storage volume, as described in greater detail below.

In response to receiving 210 the instruction to create a new snapshot, each storage node 106 finalizes 212 segments associated with the current snapshot, which may include performing garbage collection, as described in greater detail below. In addition, subsequent IOPs received by the storage node may also be processed 216 using the new snapshot as the current snapshot, as is also described in greater detail below.

Figure 3:
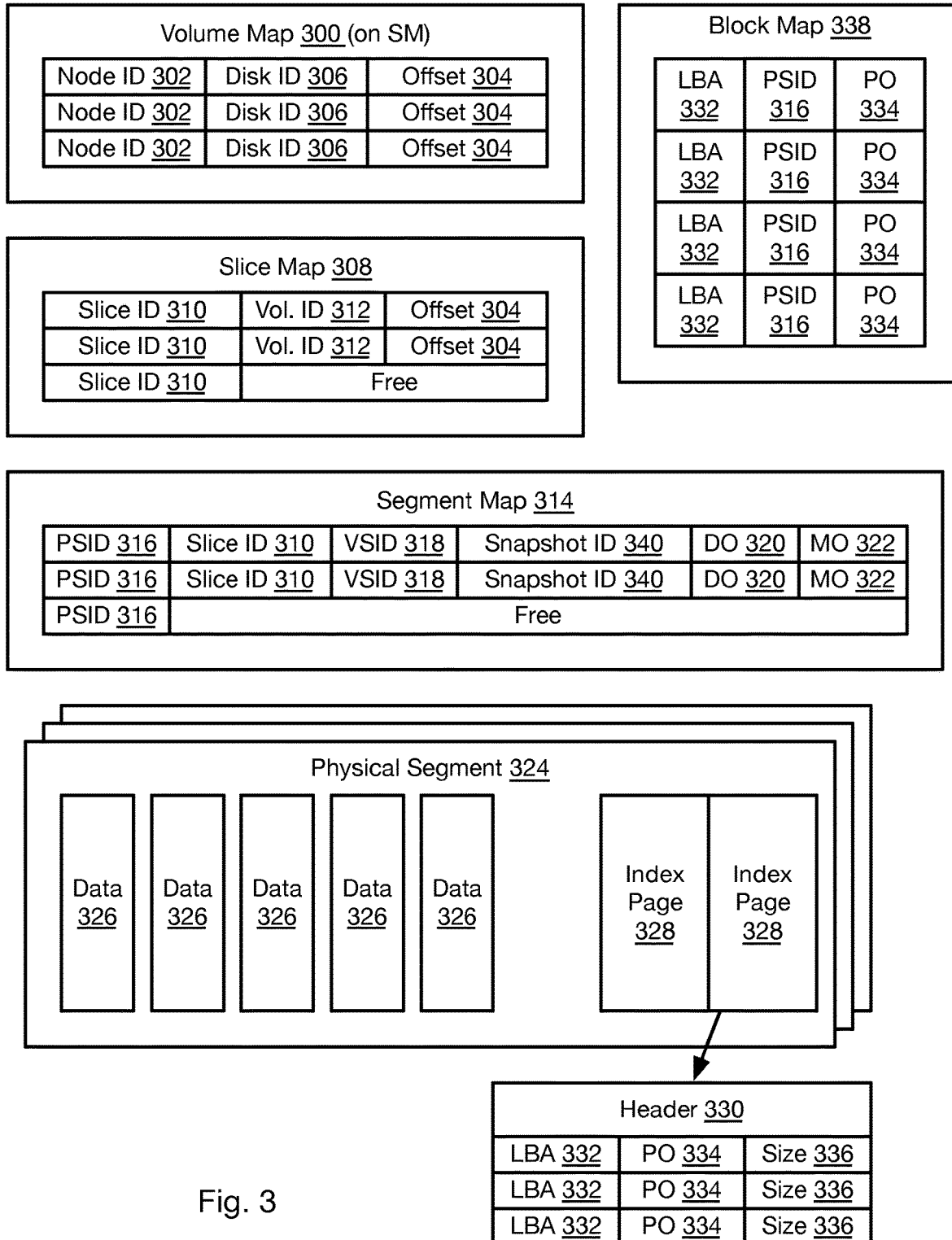
FIG. 3 is a schematic diagram illustrating the storage of data within a storage node in accordance with an embodiment of the present invention.

Referring to FIG. 3, the method by which slices are allocated, reassigned, written to, and read from may be understood with respect to the illustrated data storage scheme. The data of the storage scheme may be stored in transitory or persistent memory of the storage node 106, such as in the storage devices 108.

For each logical volume, the storage manager 102 may store and maintain a volume map 300. For each slice in the logical volume, the volume map may include an entry including a node identifier 302 identifying the storage node 106 to which the slice is assigned and an offset 304 within the logical volume at which the slice begins. In some embodiments, slices are assigned both to a storage node 106 and a specific storage device hosted by the storage node 106. Accordingly, the entry may further include a disk identifier of the storage node 106 referencing the specific storage device to which the slice is assigned.

The remaining data structures of FIG. 3 are stored on each storage node 106. The storage node 106 may store a slice map 308. The slice map 308 may include entries including a local slice identifier 310 that uniquely identifies each slice of the storage node 106, e.g. each slice of each storage device hosted by the storage node 106. The entry may further include a volume identifier 312 that identifies the logical volume to which the local slice identifier 310 is assigned. The entry may further include the offset 304 within the logical volume of the slice of the logical volume assigned to the storage node 106.

In some embodiments, an entry in the slice map 308 is created for a slice of the logical volume only after a write request is received that references the offset 304 for that slice. This further supports the implementation of overprovisioning such that slices may be assigned to a storage node 106 in excess of its actual capacity since the slice is only tied up in the slice map 308 when it is actually used.

The storage node 106 may further store and maintain a segment map 314. The segment map 314 includes entries either including or corresponding to a particular physical segment identifier (PSID) 316. For example, the segment map 314 may be in an area of memory such that each address in that area corresponds to one PSID 316 such that the entry does not actually need to include the PSID 316. The entries of the segment map 314 may further include a slice identifier 310 that identifies a local slice of the storage node 106 to which the PSID 316 has been assigned. The entry may further include a virtual segment identifier (VSID) 318. As described in greater detail below, each time a segment is assigned to logical volume and a slice of a logical volume, it may be assigned a VSID 318 such that the VSIDs 318 increase in value monotonically in order of assignment. In this manner, the most recent PSID 316 assigned to a logical volume and slice of a logical volume may easily be determined by the magnitude of the VSIDs 318 mapped to the PSIDs 316. In some embodiments, VSIDs 318 are assigned in a monotonically increasing series for all segments assigned to volume ID 312. In other embodiments, each offset 304 and its corresponding slice ID 310 is assigned VSIDs separately, such that each slice ID 310 has its own corresponding series of monotonically increasing VSIDs 318 assigned to segments allocated to that slice ID 310.

The entries of the segment map 314 may further include a data offset 320 for the PSID 316 of that entry. As described in greater detail below, when data is written to a segment it may be written at a first open position from a first end of the segment. Accordingly, the data offset 320 may indicate the location of this first open position in the segment. The data offset 320 for a segment may therefore be updated each time data is written to the segment to indicate where the new first open position is.

The entries of the segment map 314 may further include a metadata offset 322. As described in detail below, for each write request written to a segment, a metadata entry may be stored in that segment at a first open position from a second end of the segment opposite the first end. Accordingly, the metadata offset 322 in an entry of the segment map 314 may indicate a location of this first open position of the segment corresponding to the entry.

Each PSID 316 corresponds to a physical segment 324 on a device hosted by the storage node 106. As shown, data payloads 326 from various write requests are written to the physical segment 324 starting from a first end (left) of the physical segment. The physical segment may further store index pages 328 such that index pages are written starting from a second end (right) of the physical segment 324.

Each index page 328 may include a header 330. The header 330 may be coded data that enables identification of a start of an index page 328. The entries of the index page 328 each correspond to one of the data payloads 326 and are written in the same order as the data payloads 326. Each entry may include a logical block address (LBA) 332. The LBA 332 indicates an offset within the logical volume to which the data payload corresponds. The LBA 332 may indicate an offset within a slice of the logical volume. For example, inasmuch as the PSID 316 is mapped to a slice ID 310 that is mapped to an offset 304 within a particular volume ID 312, maps 308 and 314, and an LBA 332 within the slice may be mapped to the corresponding offset 304 to obtain a fully resolved address within the logical volume.

In some embodiments, the entries of the index page 328 may further include a physical offset 334 of the data payload 326 corresponding to that entry. Alternatively or additionally, the entries of the index page 328 may include a size 336 of the data payload 326 corresponding to the entry. In this manner, the offset to the start of a data payload 326 for an entry may be obtained by adding up the sizes 336 of previously written entries in the index pages 328.

The metadata offset 322 may point to the last index page 328 (furthest from right in illustrated example) and may further point to the first open entry in the last index page 328. In this manner, for each write request, the metadata entry for that request may be written to the first open position in the last index page 328. If all of the index pages 328 are full, a new index page 328 may be created and stored at the first open position from the second end and the metadata for the write request may be added at the first open position in that index page 328.

The storage node 106 may further store and maintain a block map 338. A block map 338 may be maintained for each logical volume and/or for each slice offset of each logical volume, e.g. for each local slice ID 310 which is mapped to a slice offset and logical volume by slice map 308. The entries of the block map 338 map include entries corresponding to each LBA 332 within the logical volume or slice of the logical volume. The entries may include the LBA 332 itself or may be stored at a location within the block map corresponding to an LBA 332.

The entry for each LBA 332 may include the PSID 316 identifying the physical segment 324 to which a write request referencing that LBA was last written. In some embodiments, the entry for each LBA 332 may further indicate the physical offset 334 within that physical segment 324 to which the data for that LBA was written. Alternatively, the physical offset 324 may be obtained from the index pages 328 of that physical segment. As data is written to an LBA 332, the entry for that LBA 332 may be overwritten to indicate the physical segment 324 and physical offset 334 within that segment 324 to which the most recent data was written.

In embodiments implementing multiple snapshots for a volume and slice of a volume, the segment map 314 may additionally include a snapshot ID 340 identifying the snapshot to which the PSID 316 has been assigned. In particular, each time a segment is allocated to a volume and slice of a volume, the current snapshot identifier for that volume and slice of a volume will be included as the snapshot ID 340 for that PSID 316.

In response to an instruction to create a new snapshot for a volume and slice of a volume, the storage node 106 will store the new current snapshot identifier, e.g. increment the previously stored current snapshot ID 340, and subsequently allocated segments will include the current snapshot ID 340. PSIDs 316 that are not filled and are allocated to the previous snapshot ID 340 may no longer be written to. Instead, they may be finalized or subject to garbage collection (see FIGS. 5 and 6).

Figure 4:
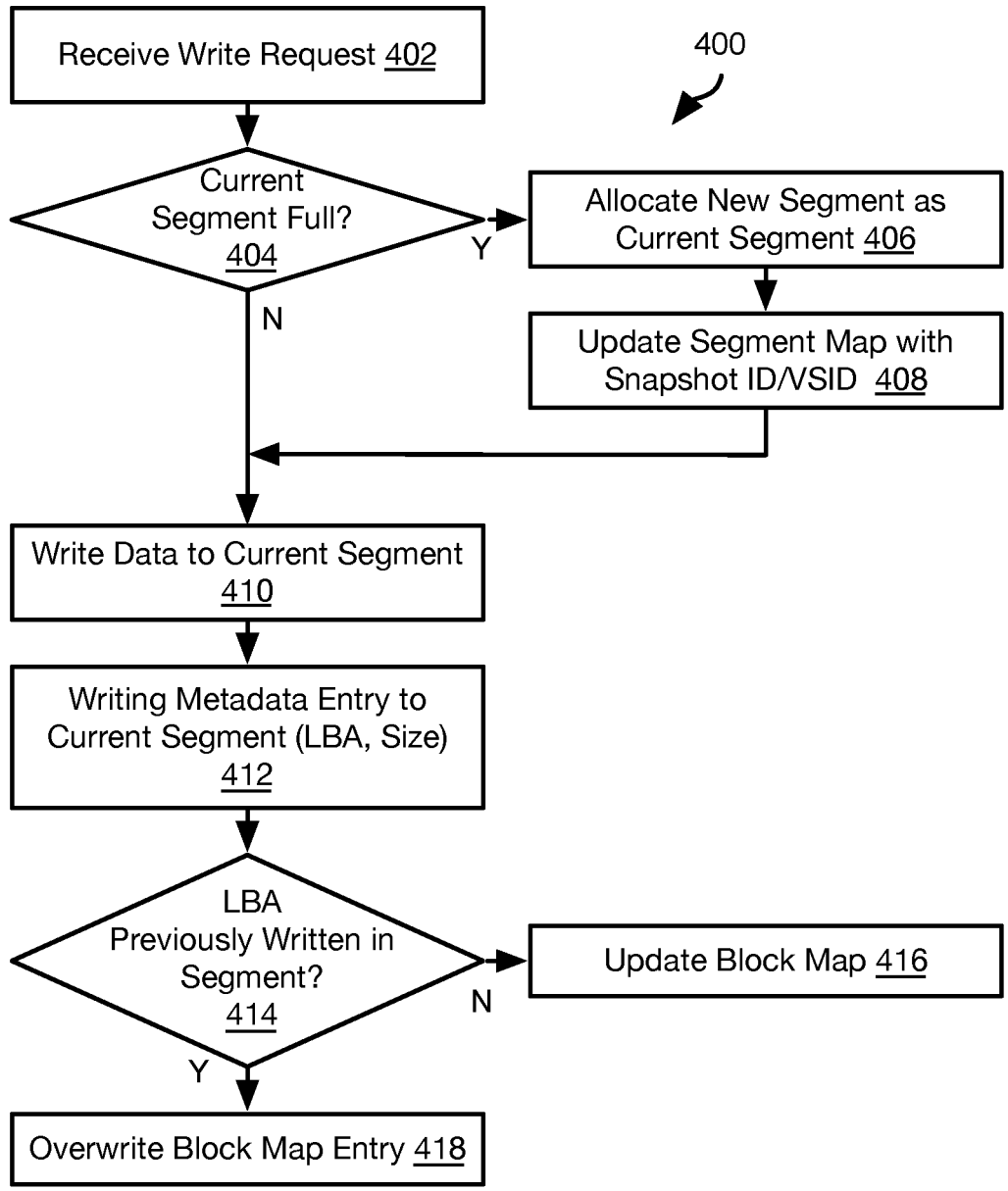
FIG. 4 is a process flow diagram of a method for processing write requests in a storage node in accordance with an embodiment of the present invention.

FIG. 4 illustrates a method 400 for executing write instructions by a storage node 106, such as write instructions received from an application executing on a compute node 110.

The method 400 includes receiving 402 a write request. The write request may include payload data, payload data size, and an LBA as well as fields such as a slice identifier, a volume identifier, and a snapshot identifier. Where a slice identifier is included, the LBA may be an offset within the slice, otherwise the LBA may be an address within the storage volume.

The method 400 may include evaluating 404 whether a PSID 316 is allocated to the snapshot referenced in the write request and whether the physical segment 324 corresponding to the PSID 316 ("the current segment") has space for the payload data. In some embodiments, as write requests are performed with respect to a PSID 316, the amount of data written as data 326 and index pages 328 may be tracked, such as by way of the data offset 320 and metadata offset 322 pointers. Accordingly, if the amount of previously-written data 326 and the number of allocated index pages 328 plus the size of the payload data and its corresponding metadata entry exceeds the capacity of the current segment it may be determined to be full at step 404.

If the current segment is determined 404 to be full, the method 400 may include allocating 406 a new PSID 316 as the current PSID 316 and its corresponding physical segment 324 as the current segment for the snapshot referenced in the write request. In some embodiments, the status of PSIDs 316 of the physical storage devices 108 may be flagged in the segment map 314 as allocated or free as a result of allocation and garbage collection, which is discussed below. Accordingly, a free PSID 316 may be identified in the segment map 314 and flagged as allocated.

The segment map 314 may also be updated 408 to include a slice ID 310 and snapshot ID 340 mapping the current PSID 316 to the snapshot ID, volume ID 312, and offset 304 included in the write request. Upon allocation, the current PSID 316 may also be mapped to a VSID (virtual segment identifier) 318 that will be a number higher than previously VSIDs 318 such that the VSIDs increase monotonically, subject, of course, to the size limit of the field used to store the VSID 318. However, the size of the field may be sufficiently large that it is not limiting in most situations.

The method 400 may include writing 410 the payload data to the current segment. As described above, this may include writing 410 payload data 326 to the free location closest to the first end of the current segment.

The method 400 may further include writing 412 a metadata entry to the current segment. This may include writing the metadata entry (LBA, size) to the first free location closest to the second end of the current segment. Alternatively, this may include writing the metadata entry to the first free location in an index page 328 that has room for it or creating a new index page 328 located adjacent a previous index page 328. Steps 410, 412 may include updating one or more pointers or table that indicates an amount of space available in the physical segment, such as a pointer 320 to the first free address closest to the first end and a pointer 322 to the first free address closest to the second end, which may be the first free address before the last index page 328 and/or the first free address in the last index page. In particular, these pointers may be maintained as the data offset 320 and metadata offset in the segment map 314 for the current PSID 316.

The method 400 may further include updating 416 the block map 338 for the current snapshot. In particular, for each LBA 332 referenced in the write request, an entry in the block map 338 for that LBA 332 may be updated to reference the current PSID 316. A write request may write to a range of LBAs 332. Accordingly, the entry for each LBA 332 in that range may be updated to refer to the current PSID 316.

Updating the block map 338 may include evaluating 414 whether an entry for a given LBA 332 referenced in the write request already exists in the block map 338. If so, then that entry is overwritten 418 to refer to the current PSID 316. If not, an entry is updated 416 in the block map 318 that maps the LBA 332 to the current PSID 316. In this manner, the block map 338 only references LBAs 332 that are actually written to, which may be less than all of the LBAs 332 of a storage volume or slice. In other embodiments, the block map 338 is of fixed size and includes and entry for each LBA 332 regardless of whether it has been written to previously. The block map 338 may also be updated to include the physical offset 334 within the current segment to which the data 326 from the write request was written.

In some embodiments, the storage node 106 may execute multiple write requests in parallel for the same LBA 332. Accordingly, it is possible that a later write can complete first and update the block map 338 whereas a previous write request to the same LBA 332 completes later. The data of the previous write request is therefore stale and the block map 338 should not be updated.

Suppressing of updating the block map 338 may be achieved by using the VSIDs 318 and physical offset 334. When executing a write request for an LBA, the VSID 318 mapped to the segment 324 and the physical offset 334 to which the data is to be, or was, written may be compared to the VSID 318 and offset 334 corresponding to the entry in the block map 338 for the LBA 332. If the VSID 318 mapped in the segment map 314 to the PSID 316 in the entry of the block map 338 corresponding to the LBA 332, then the block map 338 will not be updated. Likewise, if the VSID 318 corresponding to the PSID 316 in the block map 338 is the same as the VSID 318 for the write request and the physical offset 334 in the block map 338 is higher than the offset 334 to which the data of the write request is to be or was written, the block map 338 will not be updated for the write request.

As a result of steps 414-418, the block map 338 only lists the PSID 316 where the valid data for a given LBA 332 is stored. Accordingly, only the index pages 328 of the physical segment 324 mapped to the PSID 316 listed in the block map 338 need be searched to find the data for a given LBA 332. In instances where the physical offset 334 is stored in the block map 338, no searching is required.

Figure 5:
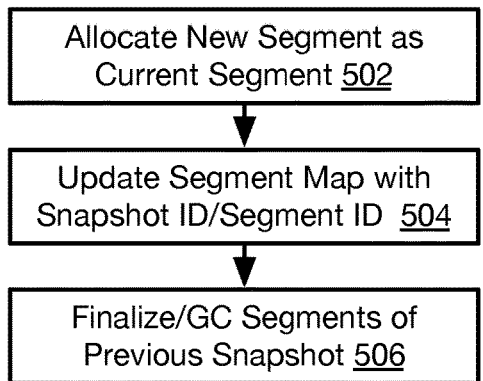
FIG. 5 is a process flow diagram of a method for processing a snapshot instruction by a storage node in accordance with an embodiment of the present invention.

FIG. 5 illustrates a method 500 executed by a storage node 106 in response to the new snapshot instruction of step 210 for a storage volume. The method 500 may be executed in response to an explicit instruction to create a new snapshot or in response to a write request that includes a new snapshot ID 340. The method 500 may also be executed with respect to a current snapshot that is still being addressed by new write requests. For example, the method 500 may be executed periodically or be triggered based on usage.

The method 500 may include allocating 502 a new PSID 316 and its corresponding physical segment 324 as the current PSID 316 and current segment for the storage volume, e.g., by including a slice ID 310 corresponding to a volume ID 312 and offset 304 included in the new snapshot instruction or the write request referencing the new snapshot ID 340. Allocating 502 a new segment may include updating 504 an entry in the segment map 314 that maps the current PSID 316 to the snapshot ID 340 and a slice ID 310 corresponding to a volume ID 312 and offset 304 included in the new snapshot instruction.

As noted above, when a PSID 316 is allocated, the VSID 318 for that PSID 316 may be a number higher than all VSIDs 318 previously assigned to that volume ID 312, and possibly to that slice ID 310 (where slices have separate series of VSIDs 318). The snapshot ID 340 of the new snapshot may be included in the new snapshot instruction or the storage node 106 may simply assign a new snapshot ID that is the previous snapshot ID 340 plus one.

The method 500 may further include finalizing 506 and performing garbage collection with respect to PSIDs 316 mapped to one or more previous snapshots IDs 340 for the volume ID 312 in the segment map 314, e.g., PSIDs 316 assigned to the snapshot ID 340 that was the current snapshot immediately before the new snapshot instruction was received.

Figure 6:
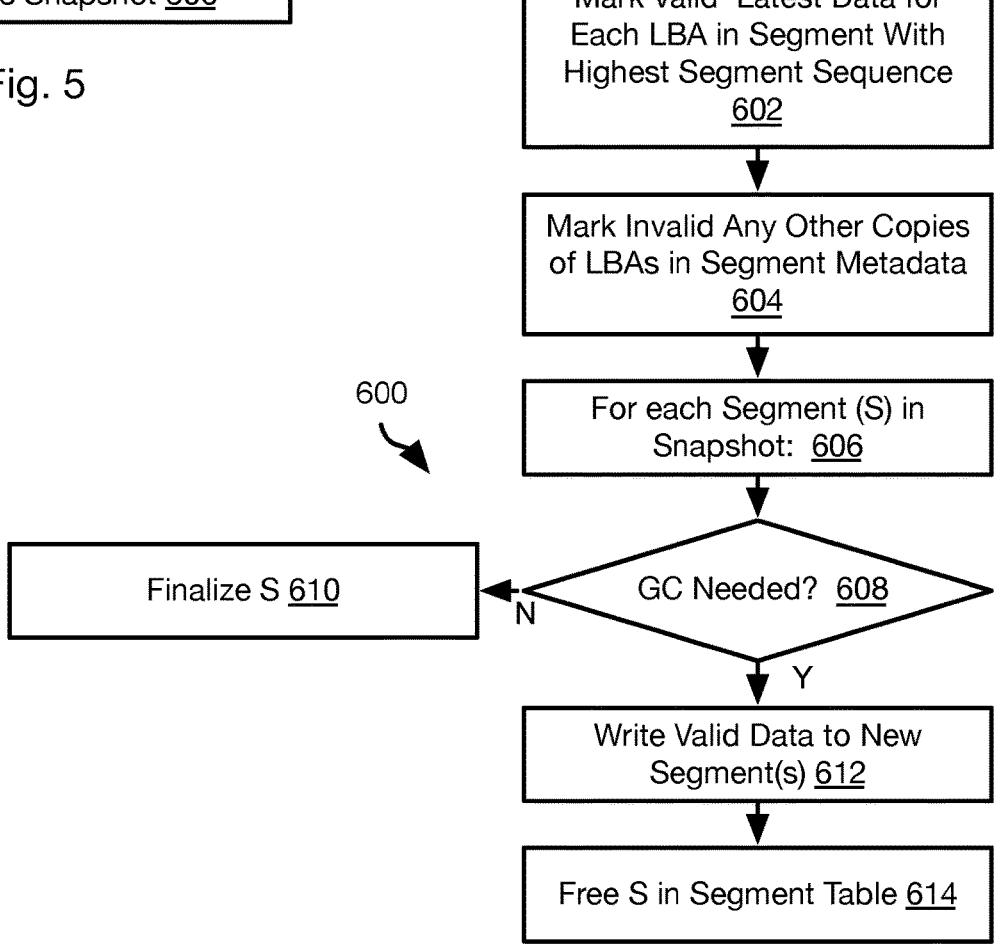
FIG. 6 is a process flow diagram of a method for performing garbage collection on segments in accordance with an embodiment of the present invention.

FIG. 6 illustrates a method 600 for finalizing and performing garbage collection with respect to segment IDs 316 for a snapshot ("the subject snapshot"), which may include the current snapshot or a previous snapshot. The method 600 may include marking 602 as valid latest-written data for an LBA 332 in the PSID 316 having the highest VSID 318 in the segment map 314 and to which data was written for that LBA 332. Marking 602 data as valid may include making an entry in a separate table that lists the location of valid data or entries for metadata in a given physical segment 324 or setting a flag in the metadata entries stored in the index pages 328 of a physical segment 324, e.g., a flag that indicates that the data referenced by that metadata is invalid or valid.

Note that the block map 338 records the PSID 316 for the latest version of the data written to a given LBA 332. Accordingly, any references to that LBA 332 in the physical segment 324 of a PSID 316 mapped to a lower-numbered VSID 318 may be marked 604 as invalid. For the physical segment 324 of the PSID 316 in the block map 338 for a given LBA 332, the last metadata entry for that LBA 332 may be found and marked as valid, i.e. the last entry referencing the LBA 332 in the index page 328 that is the last index page 328 including a reference to the LBA 332. Any other references to the LBA 332 in the physical segment 324 may be marked 604 as invalid. Note that the physical offset 334 for the LBA 332 may be included in the block map 338, so all metadata entries not corresponding to that physical offset 334 may be marked as invalid.

The method 600 may then include processing 606 each segment ID S of the PSIDs 316 mapped to the subject snapshot according to steps 608-620. In some embodiments, the processing of step 606 may exclude a current PSID 316, i.e. the last PSID 316 assigned to the subject snapshot. As described below, garbage collection may include writing valid data from a segment to a new segment. Accordingly, step 606 may commence with the PSID 316 having the lowest-valued VSID 318 for the subject snapshot. As any segments 324 are filled according to the garbage collection process, they may also be evaluated to be finalized or subject to garbage collection as described below.

The method 600 may include evaluating 608 whether garbage collection is needed for the segment ID S. This may include comparing the amount of valid data in the physical segment 324 for the segment ID S to a threshold. For example, if only 40% of the data stored in the physical segment 324 for the segment ID S has been marked valid, then garbage collection may be determined to be necessary. Other thresholds may be used, such as value between 30% and 80%. In other embodiments, the amount of valid data is compared to the size of the physical segment 324, e.g., the segment ID S is determined to need garbage collection if the amount of valid data is less than X % of the size of the physical segment 324, where X is a value between 30 and 80, such as 40.

If garbage collection is determined 608 not to be needed, the method 600 may include finalizing 610 the segment ID S. Finalizing may include flagging the segment ID S in the segment map 314 as full and no longer available to be written to. This flag may be stored in another table that lists finalized PSIDs 316.

If garbage collection is determined 608 to be needed, then the method 600 may include writing 612 the valid data to a new segment. For example, if the valid data may be written to a current PSID 316, i.e. the most-recently allocated PSID 316 for the subject snapshot, until its corresponding physical segment 324 full. If there is no room in the physical segment 324 for the current PSID 316, step 612 may include assigning a new PSID 316 as the current PSID 316 for the subject snapshot. The valid data, or remaining valid data, may then be written to the physical segment 324 corresponding to the current PSID 316 for the subject snapshot.

Note that writing 612 the valid data to the new segment maybe processed in the same manner as for any other write request (see FIG. 4) except that the snapshot ID used will be the snapshot ID 340 of the subject snapshot, which may not be the current snapshot ID. In particular, the manner in which the new PSID 316 is allocated to the subject snapshot may be performed in the same manner described above with respect to steps 406-48 of FIG. 4. Likewise, the manner in which the valid data is written to the current segment may be performed in the same manner as for steps 410-412 of FIG. 4. In some embodiments, writing of valid data to a new segment as part of garbage collection may also include updating the block map with the new location of the data for an LBA 332, such as according to steps 414-418 of FIG. 4. When the physical segment 324 of the current PSID 316 is found to be full, it may itself be subject to the process 600 by which it is finalized or subject to garbage collection.

After the valid data is written to a new segment, the method 600 may further include freeing 614 the PSID S in the segment map 314, e.g., marking the entry in segment map 314 corresponding to PSID S as free.

The process of garbage collection may be simplified for PSIDs 316 that are associated with the subject snapshot in the segment map 314 but are not listed in the block map 338 with respect to any LBA 332. The physical segments 324 of such PSIDs 316 do not store any valid data. Entries for such PSIDs 316 in the segment map 314 may therefore simply be deleted and marked as free in the segment map 314

Figure 7:
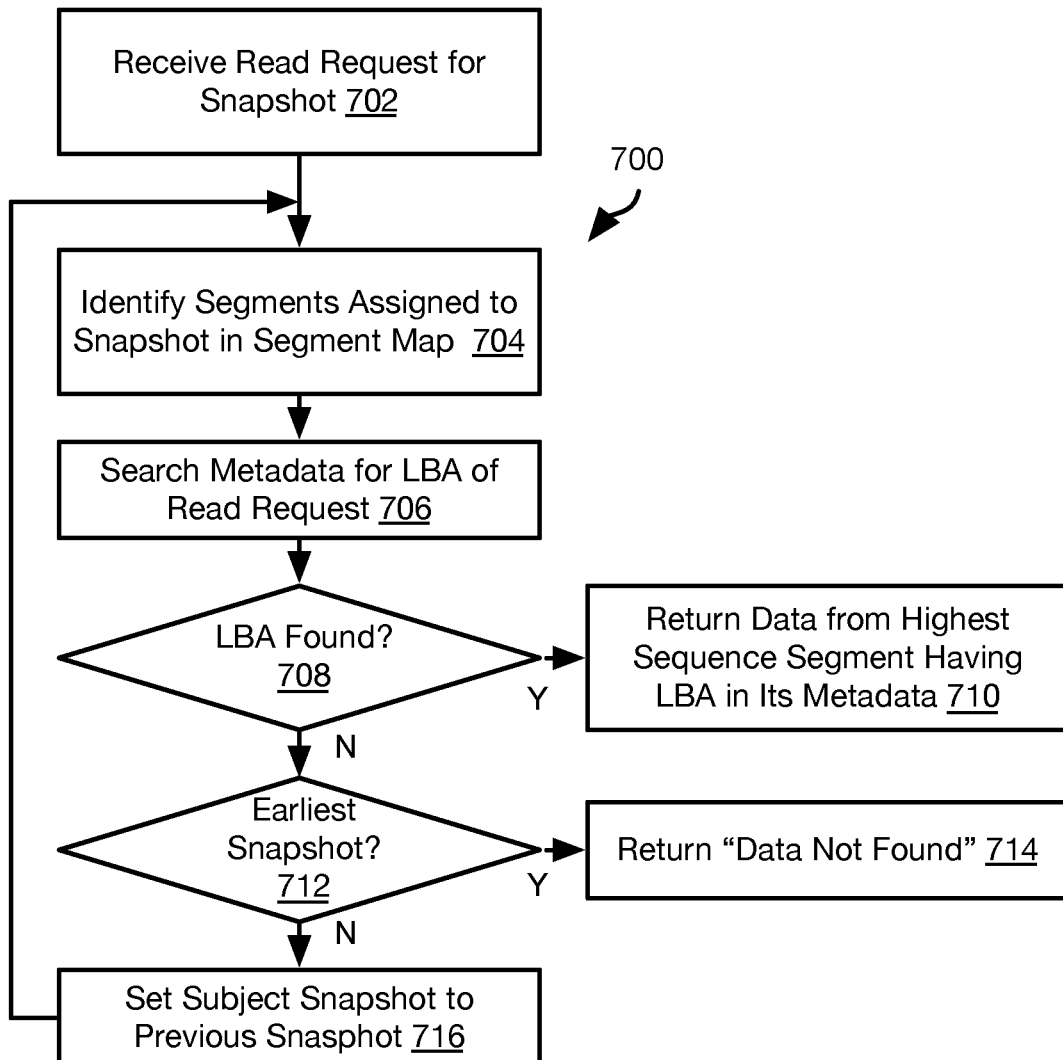
FIG. 7 is a process flow diagram of a method for reading data from a snapshot in accordance with an embodiment of the present invention.

FIG. 7 illustrates a method 700 that may be executed by a storage node 106 in response to a read request. The read request may be received from an application executing on a compute node 110. The read request may include such information as a snapshot ID, volume ID (and/or slice ID), LBA, and size (e.g. number of 4 KB blocks to read).

The following steps of the method 700 may be initially executed using the snapshot ID 340 included in the read request as "the subject snapshot," i.e., the snapshot that is currently being processed to search for requested data. The method 700 includes receiving 702 the read request by the storage node 106 and identifying 704 one or more PSIDs 316 in the segment map 314 assigned to the subject snapshot and searching 706 the metadata entries for these PSIDs 316 for references to the LBA 332 included in the read request.

The searching of step 706 may be performed in order of decreasing VSID 318, i.e. such that the metadata entries for the last allocated PSID 316 is searched first. In this manner, if reference to the LBA 332 is found, the metadata of any previously-allocated PSIDs 316 does not need to be searched.

Searching 706 the metadata for a PSID 316 may include searching one or more index pages 328 of the physical segment 324 corresponding to the PSID 316. As noted above, one or more index pages 328 are stored at the second end of the physical segment 324 and entries are added to the index pages 328 in the order they are received. Accordingly, the last-written metadata including the LBA 332 in the last index page 328 (furthest from the second end of the physical segment 324) in which the LBA 332 is found will correspond to the valid data for that LBA 332. To locate the data 326 corresponding to the last-written metadata for the LBA 332 in the physical segment 324, the sizes 336 for all previously-written metadata entries may be summed to find a start address in the physical segment 324 for the data 326. Alternatively, if the physical offset 334 is included, then the data 326 corresponding to the metadata may be located without summing the sizes 336.

If reference to the LBA 332 is found 708 in the physical segment 324 for any of the PSIDs 316 allocated to the subject snapshot, the data 326 corresponding to the last-written metadata entry including that LBA 332 in the physical segment 324 mapped to the PSID 316 having the highest VSID 318 of all PSIDs 316 in which the LBA is found will be returned 710 to the application that issued the read request.

If the LBA 332 is not found in the metadata entries for any of the PSIDs 316 mapped to subject snapshot, the method 700 may include evaluating 712 whether the subject snapshot is the earliest snapshot for the storage volume of the read request on the storage node 106. If so, then the data requested is not available to be read and the method 700 may include returning 714 a "data not found" message or otherwise indicating to the requesting application that the data is not available.

If an earlier snapshot than the subject snapshot is present for the storage volume on the storage node 106, e.g., there exists at least one PSID 316 mapped to a snapshot ID 340 that is lower than the snapshot ID 340 of the subject snapshot ID, then the immediately preceding snapshot ID 340 will be set 716 to be the subject snapshot and processing will continue at step 704, i.e. the PSIDs 316 mapped to the subject snapshot will be searched for the LBA 332 in the read request as described above.

The method 700 is particularly suited for reading data from snapshots other than the current snapshot that is currently being written to. In the case of a read request from the current snapshot, the block map 338 may map each LBA 332 to the PSID 316 in which the valid data for that LBA 332 is written. Accordingly, for such embodiments, step 704 may include retrieving the PSID 332 for the LBA 332 in the write request from the block map 338 and only searching 706 the metadata corresponding to that PSID 316. Where the block map 338 stores a physical offset 334, then the data is retrieved from that physical offset within the physical segment 316 of the PSID 336 mapped to the LBA 332 of the read request.

In some embodiments, the block map 332 may be generated for a snapshot other than the current snapshot in order to facilitate executing read requests, such as where a large number of read requests are anticipated in order to reduce latency. This may include searching the index pages 328 of the segments 324 allocated to the subject snapshot and its preceding snapshots to identify, for each LBA 332 to which data has been written, the PSID 316 having the highest VSID 318 of the PSIDs 316 having physical segments 324 storing data written to the each LBA 332. This PSID 316 may then be written to the block map 338 for the each LBA 332. Likewise, the physical offset 334 of the last-written data for that LBA 332 within the physical segment 324 for that PSID 316 may be identified as described above (e.g., as described above with respect to steps 704-716).

Figure 8:
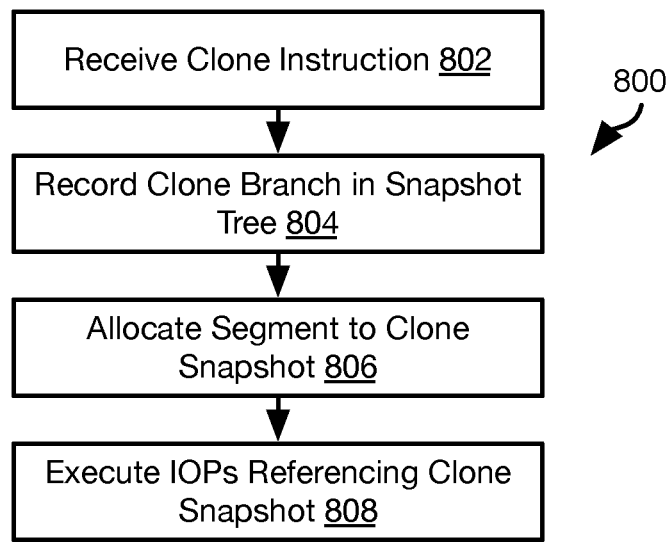
FIG. 8 is a process flow diagram of a method for cloning a snapshot in accordance with an embodiment of the present invention.

Referring to FIG. 8, in some instances it may be beneficial to clone a storage volume. This may include capturing a current state of a principal copy of a storage volume and making changes to it without affecting the principal copy of the storage volume. For purposes of this disclosure a "principal copy" or "principal snapshot" of a storage volume refers to an actual production copy that is part of a series of snapshots that is considered by the user to be the current, official, or most up-to-date copy of the storage volume. In contrast, a clone snapshot is a snapshot created for experimentation or evaluation but changes to it are not intended by the user to become part of the production copy of the storage volume. Stated differently, only one snapshot may be a principal snapshot with respect to an immediately preceding snapshot, independent of the purpose of the snapshot. Any other snapshots that are immediate descendants of the immediately preceding snapshot are clone snapshots.

The illustrated method 800 may be executed by the storage manager 102 and one or more storage nodes 106 in order to implement this functionality. The method 800 may include receiving 802 a clone instruction and executing the remaining steps of the method 800 in response to the clone instruction. The clone instruction may be received by the storage manager 102 from a user or be generated according to a script or other program executing on the storage manager 102 or a remote computing device in communication with the storage manager 102.

Figure 9:
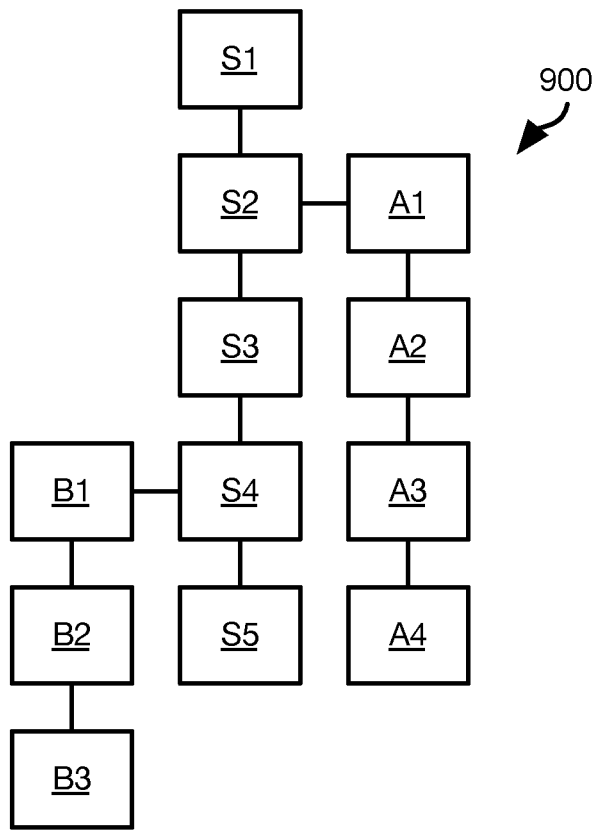
FIG. 9 illustrates a snapshot hierarchy created in accordance with an embodiment of the present invention.

The method 800 may include recording 804 a clone branch in a snapshot tree. For example, referring to FIG. 9, in some embodiments, for each snapshot that is created for a storage volume, the storage manager 102 may create a node S1-S5 in a snapshot hierarchy 900. In response to a clone instruction, the storage manager 102 may create a clone snapshot and branch to a node A1 representing the clone snapshot. In the illustrated example, a clone instruction was received with respect to the snapshot of node S2. This resulted in the creation of clone snapshot represented by node A1 that branches from node S2. Note node S3 and its descendants are also connected to node S2 in the hierarchy.

In some embodiments, the clone instruction may specify which snapshot the clone snapshot is of. In other embodiments, the clone instruction may be inferred to be a snapshot of a current snapshot. In such embodiments, a new principal snapshot may be created and become the current snapshot. The previous snapshot will then be finalized and be subject to garbage collection as described above. The clone will then branch from the previous snapshot. In the illustrated example, if node S2 represented the current snapshot, then a new snapshot represented by node S3 would be created. The snapshot of node S2 would then be finalized and subject to garbage collection and clone snapshot represented by A1 would be created and node A1 would be added to the hierarchy as a descendent of node S2.

In some embodiments, the clone node A1, and possibly its descendants A2 to A4 (representing subsequent snapshots of the clone snapshot), may be distinguished from the nodes S1 to S5 representing principal snapshots, such as by means of a flag, a classification of the connection between the node A1 and node S2 that is its immediate ancestor, or by storing data defining node A1 in a separate data structure.

Following creation of a clone snapshot, other principal snapshots of the storage volume may be created and added to represented in the hierarchy by one or more nodes S2 to S5. A clone may be created of any of these snapshots and represented by additional clone nodes. In the illustrated example, node B1 represents a clone snapshot of the snapshot represented by node S4. Subsequent snapshots of the clone snapshot are represented by nodes B1 to B3.

Referring again to FIG. 8, the creation of a clone snapshot on the storage node 106 may be performed in the identical manner as for any other snapshot, such as according to the methods of FIGS. 2 through 6. In particular, one or more segments 806 may be allocated to the clone snapshot on storage nodes 106 storing slices of the cloned storage volume and mapped to the clone snapshot. IOPs referencing the clone snapshot may be executed 808, such as according to the method 400 of FIG. 4.

In some instances, it may be desirable to store a clone snapshot on a different storage node 106 than the principal snapshots. Accordingly, the method 800 may include allocating 806 segments to the clone snapshot on the different storage node 106. This may be invoked by sending a new snapshot instruction referencing the clone snapshot (i.e., an identifier of the clone snapshot) to the different storage node 106 and instructing one or more compute nodes 110 to route IOPs for the clone snapshot to the different storage node 106.

The storage manager 102 may store in each node of the hierarchy, data identifying one or more storage nodes 106 that store data for the snapshot represented by that node of the hierarchy. For example, each node may store or have associated therewith one or more identifiers of storage nodes 106 that store a particular snapshot ID for a particular volume ID. The node may further map one or more slice IDs (e.g., slice offsets) of a storage volume to one storage nodes 106 storing data for that slice ID and the snapshots for that slice ID.

Figure 10:
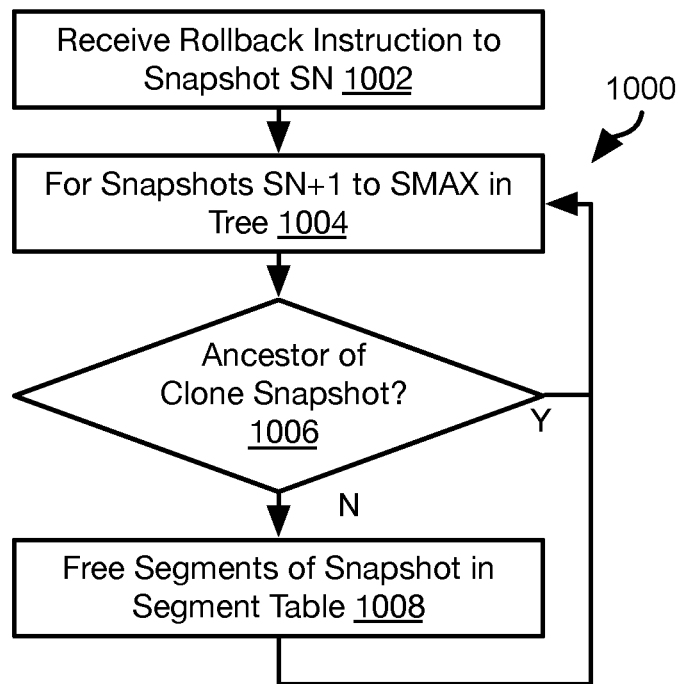
FIG. 10 is a process flow diagram of a method for rolling back to a prior snapshot in accordance with an embodiment of the present invention.

Referring to FIG. 10, one of the benefits of snapshots is the ability to capture the state of a storage volume such that it can be restored at a later time. FIG. 10 illustrates a method 1000 for rolling back a storage volume to a previous snapshot, particularly for a storage volume having one or more clone snapshots.

The method 1000 includes receiving 1002, by the storage manager 102, an instruction to rollback a storage volume to a particular snapshot SN. The method 1000 may then include processing 1004 each snapshot that is a represented by a descendent node of the node representing snapshot SN in the snapshot hierarchy, i.e. snapshots SN+1 to SMAX, where SMAX is the last principal snapshot that is a descendent of snapshot SN (each "descendent snapshot"). For each descendent snapshot, processing 1004 may include evaluating 1006 whether the each descendent is an ancestor of a node representing a clone snapshot. If not, then the storage manager 102 may instruct all storage nodes 106 storing segments mapped to the descendent snapshot to free 1008 these segments, i.e. delete entries from the segment map referencing the descendent snapshot and marking corresponding PSIDs 316 as free in the segment map 314.

If the descendent snapshot is found 1006 to be an ancestor of a clone snapshot, then step 1008 is not performed and the snapshot and any segments allocated to it are retained.

Figure 11:
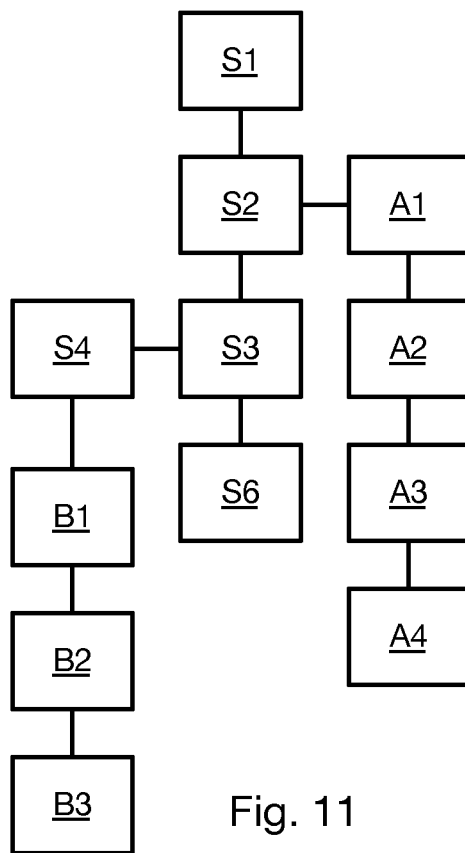
FIG. 11 illustrates the snapshot hierarchy of FIG. 9 as modified according to the method of FIG. 10 in accordance with an embodiment of the present invention.

FIG. 11 illustrates the snapshot hierarchy following execution of the method 1000 with respect to the snapshot represented by node S3. As is apparent, snapshot S5 has been removed from the hierarchy and any segments corresponding to these snapshots will have been freed on one or more storage nodes 106.

However, since node S4 is an ancestor of clone node B1, it is not removed and segments corresponding to it are not freed on one or more storage nodes in response to the roll back instruction. Inasmuch as each snapshot contains only data written to the storage volume after it was created, previous snapshots may be required to recreate the storage volume. Accordingly, the snapshots of nodes S3 to S1 are needed to create the snapshot of the storage volume corresponding to node B1.

Subsequent principal snapshots of the storage volume will be added as descendants of the node to which the storage volume was rolled back. In the illustrated example, a new principal snapshot is represented by node S6 that is an immediate descendent of node S3. Node S4 is only present due to clone node B1 and therefore may itself be classified as a clone node in the hierarchy in response to the rollback instruction of step 1002.

Note that FIG. 11 is a simple representation of a hierarchy. There could be any number of clone snapshots, clones of clone snapshots and descendent snapshots of any of these snapshots represented by nodes of a hierarchy. Accordingly, to roll back to a particular snapshot of a clone, the method 1000 is the same, except that descendants of the clone snapshot are treated the same as principal snapshots and clones of any of these descendants are treated the same as a clone snapshot.

Figure 12:
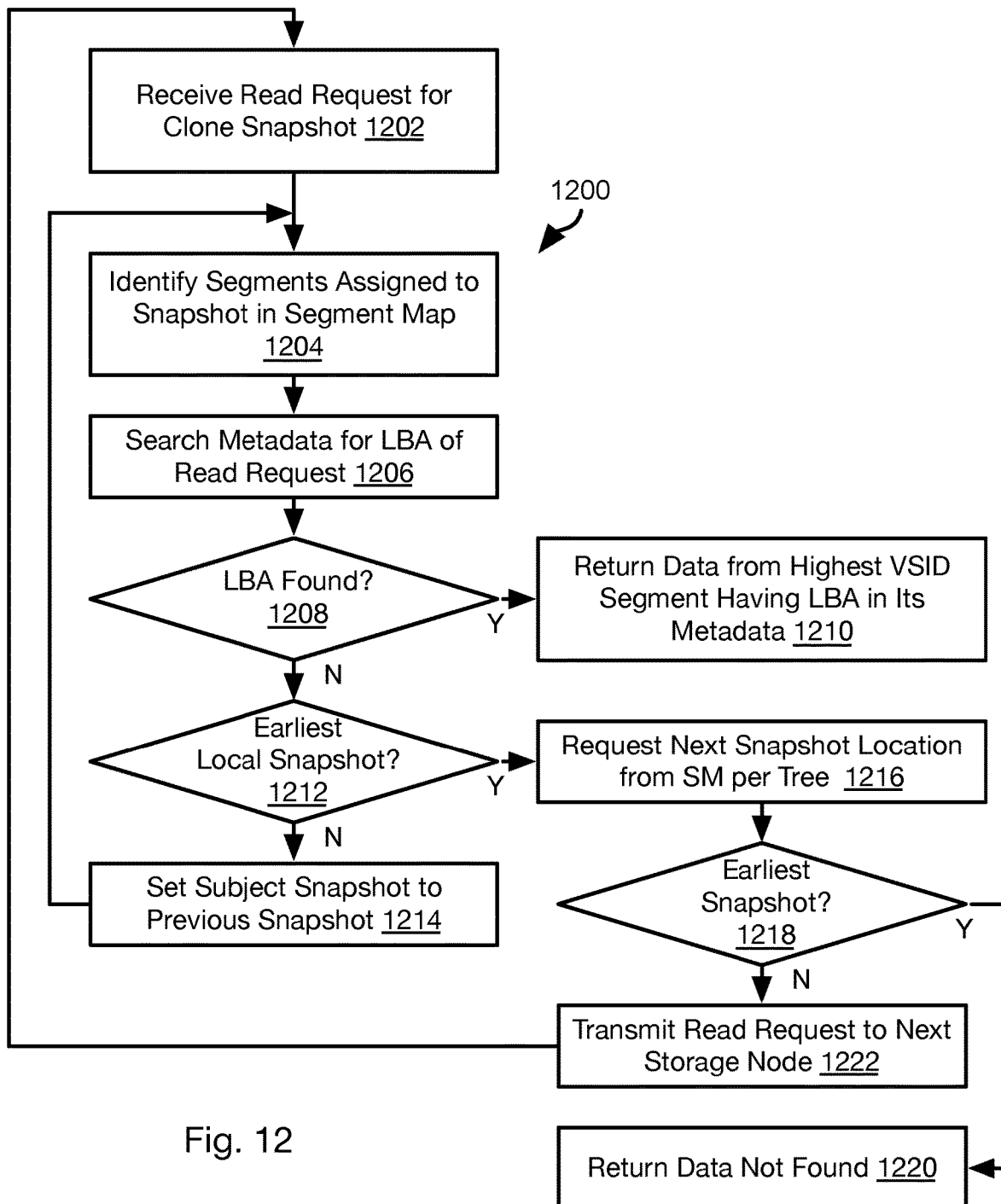
FIG. 12 is a process flow diagram of a method for reading from a clone snapshot in accordance with an embodiment of the present invention.

Referring to FIG. 12, the illustrated method 1200 may be used to execute a read request with respect to a storage volume that is represented by a hierarchy generated as described above with respect to FIGS. 8 through 11. The illustrated method 1200 may also be executed with respect to a storage volume that includes only principal snapshots that are distributed across multiple storage nodes, i.e., all the segments corresponding to snapshots of the same slice of the storage volume are not located on the same storage node 106. In that case, the hierarchy stored on the storage manager 102 stores the location of the segments for each snapshot and therefore enables them to be located.

The method 1200 may be executed by a storage node 106 ("the current storage node") with information retrieved from the storage manager 102 as noted below. The method 1200 may include receiving 1202 a read request, which may include such information as a snapshot ID, volume ID (and/or slice ID), LBA, and size (e.g. number of 4 KB blocks to read).

Note that the read request may be issued by an application executing on a compute node 110. The compute node 110 may determine which storage node 106 to transmit the read request using information from the storage manager 102. For example, the compute node 110 may transmit a request to obtain an identifier for the storage node 106 storing data for a particular slice and snapshot of a storage volume. The storage manager may then obtain an identifier and/or address for the storage node 106 storing that snapshot and slice of the storage volume from the hierarchical representation of the storage volume and return it to the requesting compute node 110. For example, the storage manager 102 may retrieve this information from the node in the hierarchy representing the snapshot included in the read request.

In response to the read request, the current storage node performs the algorithm illustrated by subsequent steps of the method 1200. In particular, the method 1200 may include identifying 1204 segments assigned to the snapshot ID of the read request in the segment ("the subject snapshot").

The method 1200 may include searching 1206 the metadata of the segments identified in step 1204 for the LBA of the read request. If the LBA is found 1208, the data from the highest numbered segment having the LBA in its metadata is returned 1210, i.e. the data that corresponds to the last-written metadata entry including the LBA.

If the LBA is not found in any of the segments mapped to subject snapshot, then the method 1200 may include evaluating 1212 whether the subject snapshot is the earliest snapshot on the current storage node. If not, then steps processing continues at step 1204 with the previous snapshot set 1214 as the subject snapshot.

Steps 1204-1214 may be performed in the same manner as for steps 704-714 of the method 700, including the various modifications and variations described above with respect to the method 700.

In contrast to the method 700, if the LBA is not found in any of the segments corresponding to the subject snapshot for any of the snapshots evaluated, then the method 1200 may include requesting 1216 a location, e.g. storage node identifier, where an earlier snapshot for the volume ID or slice ID is stored. In response to this request, the storage manager 102 determines an identifier of a storage node 106 storing the snapshot corresponding to the immediate ancestor of the earliest snapshot stored on the current storage node in the hierarchy. The storage manager 102 may determine an identifier of the storage node 106 relating to the immediate-ancestor snapshot and that stores data for a slice ID and volume ID of the read request as recorded for the ancestor nearest ancestor node in the hierarchy of the node corresponding to the earliest snapshot stored on the current storage node.

If the current storage node is found 1218 to be the earliest snapshot for the storage volume ID and/or slice ID of the read request, then the data the storage manager 102 may report this fact to the storage node, which will then return 1220 a message indicating that the requested LBA is not available for reading, such as in the same manner as step 714 of the method 700.

If another storage node stores an earlier snapshot for the volume ID and/or slice ID of the read request, then the read request may be transmitted 1222 to this next storage node by either the current storage node or the storage manager 102. The processing may then continue at step 1202 with the next storage node as the current storage node. The read request transmitted at step 1222 may have a snapshot ID set to the latest snapshot ID for the storage volume ID and or slice ID of the original read request.

The method 1200 may be performed repeatedly across multiple storage nodes 106 until the earliest snapshot is encountered or the LBA of the read request is located.

Figure 13:
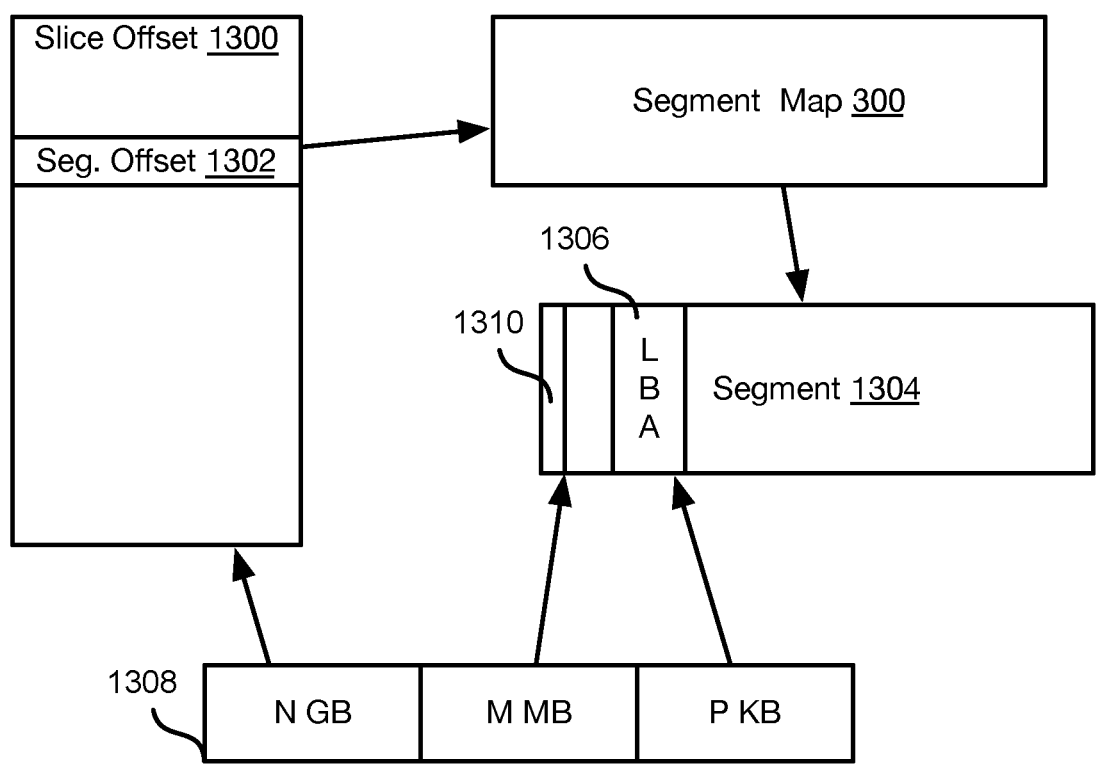
FIG. 13 is a schematic block diagram illustrating the storage and accessing of a slice of a storage volume that is not subject to creation of snapshots in accordance with an embodiment of the present invention.

Referring to FIG. 13, in some embodiments, the distributed storage system may permit a user to elect a non-snapshot storage volume. In particular, data may be stored in segments without metadata (e.g., index pages 328) indicating which LBAs are written to that segment. This may be done to reduce the overhead of writing metadata in addition to payload data.

For example, a slice having a slice offset 1300 within a storage volume may be divided into segments. For example, a 1 GB slice may be divided into 32 GB segments, each segment beginning at a segment offset 1302, e.g. (N−1)*32 GB, where N is the position of the segment within the slice for slice offset 1300. A segment 1304 of storage (e.g. a physical segment 324) may be allocated to each segment offset 1302. The segment map 300 may map the PSID of the segment 1304 to some or all of the segment offset 1302 and the slice offset 1300 of the slice 1300 or some other identifier corresponding the volume identifier of the storage volume to which the slice belongs and the offset 1300 of the slice (see, e.g., discussion of FIG. 3 including a slice map 308 and slice ID 310 in the segment map).

For a given address 1308 including an N GB offset, M MB offset, and a P KB offset, where N, M, and P are integers, the segment 1304 and an LBA 1306 within that segment may be readily identified. The N GB offset of the address corresponds to the slice offset 1300. The M MB offset may be resolved to the segment offset 1302: (M−M %32), where M is the modulus operator such that (A*32+B) %32=B.

The segment 1304 for the segment offset 1302 may then be obtained from the segment map 300. The offset within the segment may be obtained from the KB offset P. For example, for 4 KB logical blocks, the starting address for an LBA 1306 within the segment 1304 may be determined as P−P %4.

Note that in some embodiments, non-snapshot segments as described with respect to FIG. 13 may further include a segment header 1310. The segment header may store information that may be used to restore the segment map 300 in the event that it is lost or corrupted. Accordingly, the segment header 1310 may indicate some or all of the slice offset 1300, segment offset 1302, and storage volume identifier to which the segment 1304 is allocated.

Figure 14:
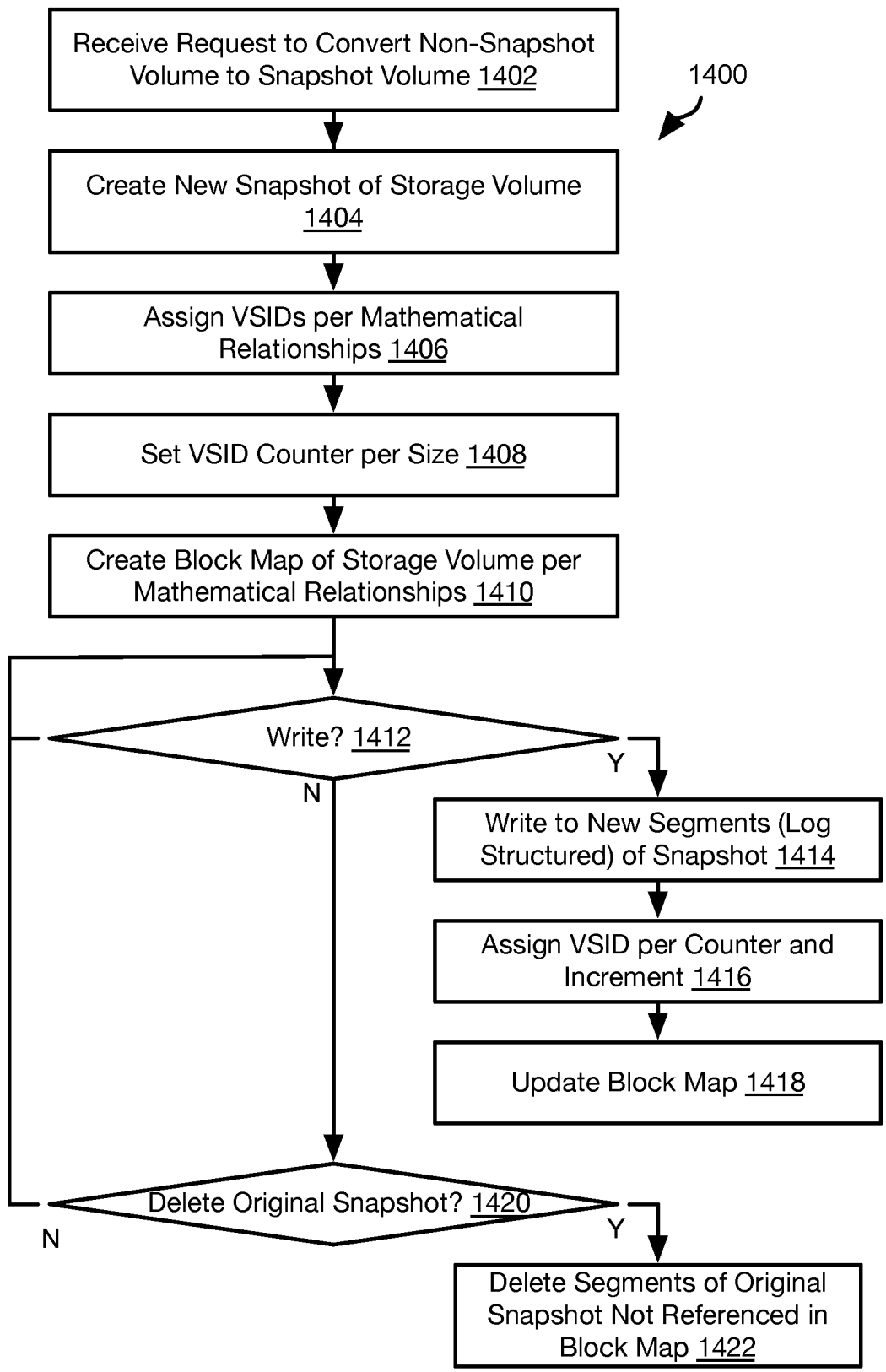
FIG. 14 is a process flow diagram of a method for converting a non-snapshot volume to a snapshot volume in accordance with an embodiment of the present invention.

Read and write operations are therefore performed in a straightforward manner: the segment 1304 and LBA offset are determined from the address of the operation and data is read from that offset for a read operation or written to that offset for write operations FIG. 14 illustrates an example method 1400 that may be used to convert a non-snapshot storage volume to a snapshot storage volume, such as snapshot storage volume implemented as described above with respect to some or all of FIGS. 1-12.

The method 1400 may include receiving 1402 a request to convert a storage volume from a non-snapshot storage volume to a snapshot storage volume. For example, a user may input the request to the storage manager 102, which then instructs storage nodes 106 storing slices of the storage volume referenced in the request to execute the method 1400 with respect to those slices.

In response to the request, the storage manager 102 invokes creation 1404 of a new snapshot. This may include executing the method 200 of FIG. 2. Accordingly, new write requests to a storage node 106 hosting a slice of the storage volume will write new requests to newly allocated segments allocated to the new snapshot. Note that in some embodiments, subsequent write requests may be performed as described above, such as described with respect to FIGS. 3 and 4.

In some embodiments, segments 1304 allocated or both allocated and written to while the storage volume was a non-snapshot volume as described with respect to FIG. 13 may be processed according to the method 1400 in order to operate in a consistent manner with respect to the snapshot approach implemented for segments allocated to the new snapshots according to the approach of FIGS. 2-12.

For example, as described above, subsequent segments will be assigned VSIDs according to a monotonically increasing segment and these VSIDs may be used when processing reads to snapshots (see, e.g., FIG. 7).

The method 1400 may include assigning 1406 VSIDs (i.e., sequence numbers) to the segments 1304 allocated to the segment offsets 1302 of a slice offset 1300. In some embodiments, these VSIDs are assigned according to a mathematical relationship, i.e., the Nth 32 MB segment is assigned N as its VSID. Accordingly, VSIDs are assigned according to location of a segment within the slice not according to order of allocation. Segments allocated subsequent to creation of the snapshot are assigned VSIDs from the counter such that VSIDs indicate order of allocation.

The method 1400 may further include setting 1408 the VSID counter to a value corresponding to the size of the slice. For example, if a slice includes M segments, the VSID counter will be set to M, assuming that VSIDs are assigned starting at zero.

The method 1400 may further include creating 1410 a block map for the slice offset 1400. In particular, with reference to the block map 338, the LBA 332, PSID 316, and PO 334 for each LBA in a slice may be assigned according to mathematical relationships. For example, the segment map 300 maps a segment 1304 to a segment offset and that segment 1304 includes a range of LBAs, i.e. every 4 KB boundary for 4K LBAs is the offset for an LBA. Accordingly, the block map 338 may be create and written to such that the entry for a given LBA 332 includes the PSID of the segment 1304 including that LBA 332 and the physical offset 334 of that LBA, i.e. the 4 KB boundary at which that LBA 332 is written for 4 KB blocks. For example, an LBA that has an address at N GB, M MB, and P KB within the storage volume, the PO 334 will be P, or P %4 where the PO 334 is indicated in blocks and blocks are 4 KB in size.

When writes are received 1412 subsequent to creation 1404 of the new snapshot, the data from the writes is written 1414 to segments allocated to the new snapshot in the manner described above with respect to FIGS. 3 and 4. In particular, writes are performed in a log-structured format in which data is written to a segment in the order received with metadata entries indicating the physical offset within the segment at which data for a particular LBA is written, i.e. the LBA itself does not indicate the location within the segment. Likewise, new segments allocated to the snapshot are assigned 1416 values according to the VSID counter and the counter is incremented as described above, i.e. the sequence number is no longer related to the segment offset but rather the order of allocation.

Processing of a write may also include updating 1418 the block map 338. In particular, for each LBA referenced by a write operation, the block map 338 may be updated such that the entry for that LBA references the PSID of the segment to which the data for that LBA was written and the physical offset within that segment at which the data was written.

In the event that the original snapshot, i.e. the data written prior to conversion of the storage volume from a non-snapshot volume to a snapshot volume, is deleted 1420, the method 1400 may include deleting 1422, i.e. marking as free in the segment map, those segments allocated to the original snapshot in the segment map and that are not referenced in the block map due to all LBAs in it having been overwritten.

Note that for read commands for LBAs that are not written to in the new snapshot, the original snapshot may be evaluated to see if there is data for that LBA. A read may be performed in the same manner as described with respect to FIG. 12, except that there is no need to determine the physical offset from metadata when reading from the original snapshot as this will be in the block map and can be determined based on the LBA.

Figure 15:
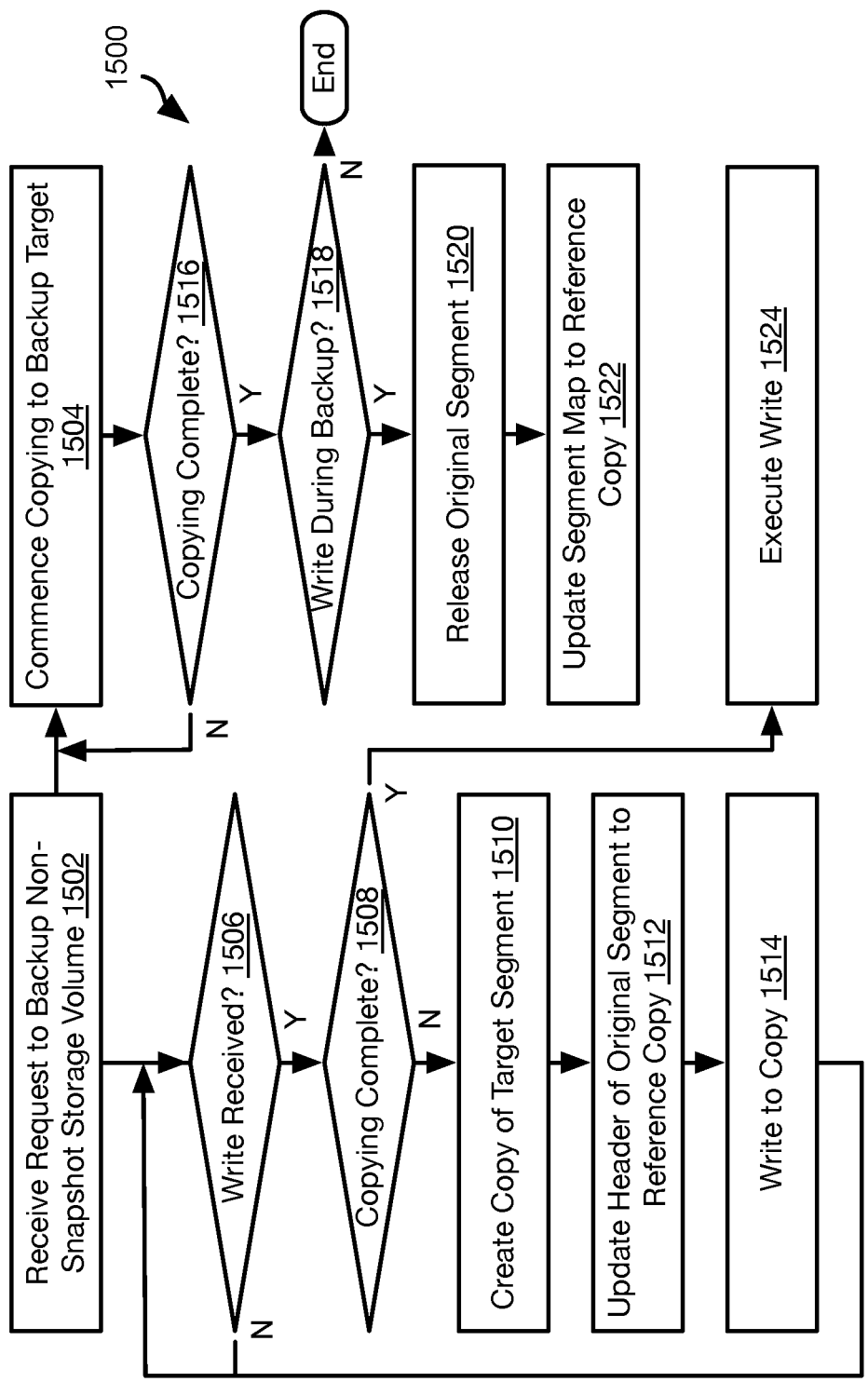
FIG. 15 is a process flow diagram of a method for creating a backup copy of a non-snapshot storage volume in accordance with an embodiment of the present invention.

FIG. 15 illustrates a method 1500 that may be used to create a backup copy of a non-snapshot volume, such as a non-snapshot volume as defined above with respect to FIG. 13. For example, a user may instruct the storage manager 102 to create a backup of a non-snapshot volume. In response, the storage manager 102 may instruct storage nodes 106 storing slices of the non-snapshot volume to execute the method 1500 with respect to each slices stored thereon.

The method 1500 may include receiving 1502 a request to backup a slice of the non-snapshot storage volume, the request indicating a backup target on which the backup copy is to be created, which may be another storage node 106, a cloud storage platform, or some other storage system.

In response, the storage node 106 commences copying 1504 the segments of the slice to the backup target. The method 1500 may include evaluating 1506, 1508 whether a write request referencing the slice is received prior to completion of copying of the slice to the backup target.

If so, the method 1500 may include creating a copy of a target segment of the write request. In particular, as described above with respect to FIG. 13, the segment and physical offset within a segment may be determined from an LBA. Accordingly, the segment offset for a segment referenced by the write request may be determined and the corresponding original physical segment for that segment may be determined from the segment map 300 using the relationships between address and segment offset as described with respect to FIG. 13. The original physical segment may therefore be copied to a different physical segment ("the copy segment") at step 1510.

The header 1310 of the original physical segment may also be updated 1512 to reference the copy segment. In some embodiments, the segment map 300 is updated to map the copy segment to the slice and the block map 338 may be updated to change references to the PSID of the original physical segment with the PSID of the copy segment.

The payload data from the write request may then be written 1514 to the copy segment, i.e. at the physical offset corresponding to the LBA referenced the write request. Note that if other write requests are received prior to completion of copying 1504 to the backup target and that are addressed to the segment offset corresponding to the copy segment and original physical segment, the data from these will be written 1514 to the copy segment and steps 1510 and 1512 may be omitted.

When copying of the slice to the backup target is found 1516 to have completed, the method 1500 may include evaluating 1518 whether any write requests for the slice were received during copying 1504. If not, the method 1500 ends. If so, the method 1500 may include releasing 1520 (marking as free in segment map 300) any original physical segments written to according to steps 1506-1514. If not already performed, the method 1500 may include updating 1522 the segment map such that it references the PSID of the copy segments. For example, an entry in the segment map mapping an original physical segment to a segment offset in the segment map 300 may be updated to replace the PSID of the original physical segment with the PSID of the corresponding copy segment that was a copy of that original physical segment according to step 1510. If not already done, references to the PSID of the original physical segment in the block map 338 may be replaced with references to the PSID of the corresponding copy segment. Accordingly, if there is a VSID in the entry it will now be associated with the PSID of the copy segment.

Note that in the event that the segment map 300 or block map 338 are lost, they may be recreated using the headers 1310 of the original physical segments, which will indicate the PSID of the corresponding copy segment.

Write request received after the copy to the backup target is complete may be executed 1524 with respect to whichever physical segment corresponds to the LBA (segment offset and physical offset within a segment) corresponding to the address of the write request, which may be a copy segment.

Copy segments modified while the copying of step 1504 is ongoing may also be copied to the backup target and replace the backup copy on the backup target corresponding to the same segment offset as the copy segments, i.e. backup copies of the original physical segment of which the copy segment was a copy.

Subsequent write requests may also be propagated to the backup target which may modify corresponding backup copies accordingly, i.e. write to the backup segment corresponding to the segment offset derived from the address referenced by the write request.

Figure 16:
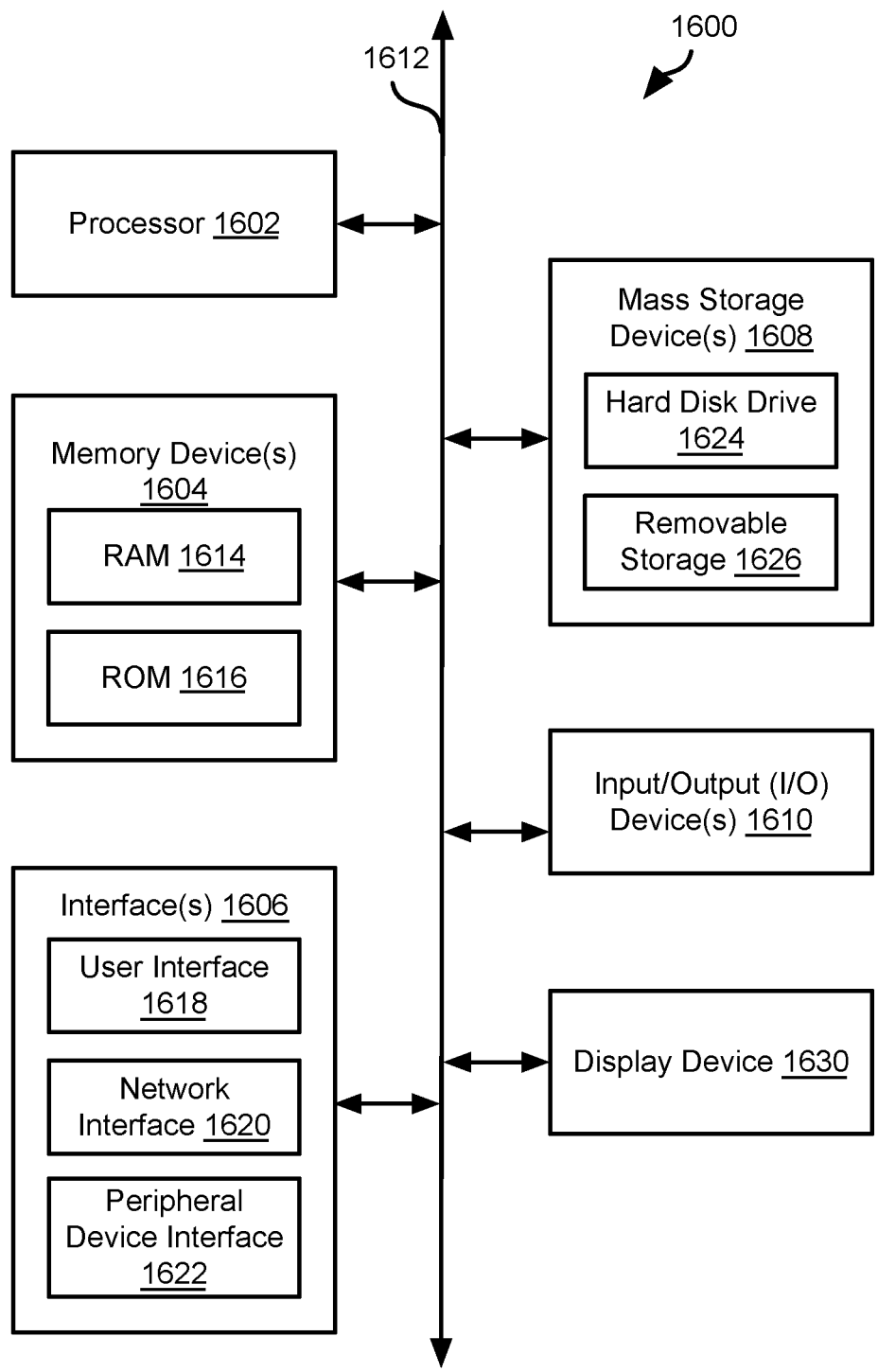
FIG. 16 is a schematic block diagram of an example computing device suitable for implementing methods in accordance with embodiments of the invention.

FIG. 16 is a block diagram illustrating an example computing device 1600. Computing device 1600 may be used to perform various procedures, such as those discussed herein. The storage manager 102, storage nodes 106, and compute nodes 110 may have some or all of the attributes of the computing device 1600.

Computing device 1600 includes one or more processor(s) 1602, one or more memory device(s) 1604, one or more interface(s) 1606, one or more mass storage device(s) 1608, one or more Input/output (I/O) device(s) 1610, and a display device 1630 all of which are coupled to a bus 1612. Processor(s) 1602 include one or more processors or controllers that execute instructions stored in memory device(s) 1604 and/or mass storage device(s) 1608. Processor(s) 1602 may also include various types of computer-readable media, such as cache memory.

Memory device(s) 1604 include various computer-readable media, such as volatile memory (e.g., random access memory (RAM) 1614) and/or nonvolatile memory (e.g., read-only memory (ROM) 1616). Memory device(s) 1604 may also include rewritable ROM, such as Flash memory.

Mass storage device(s) 1608 include various computer readable media, such as magnetic tapes, magnetic disks, optical disks, solid-state memory (e.g., Flash memory), and so forth. As shown in FIG. 16, a particular mass storage device is a hard disk drive 1624. Various drives may also be included in mass storage device(s) 1608 to enable reading from and/or writing to the various computer readable media. Mass storage device(s) 1608 include removable media 1626 and/or non-removable media.

I/O device(s) 1610 include various devices that allow data and/or other information to be input to or retrieved from computing device 1600. Example I/O device(s) 1610 include cursor control devices, keyboards, keypads, microphones, monitors or other display devices, speakers, printers, network interface cards, modems, lenses, CCDs or other image capture devices, and the like.

Display device 1630 includes any type of device capable of displaying information to one or more users of computing device 1600. Examples of display device 1630 include a monitor, display terminal, video projection device, and the like.

Interface(s) 1606 include various interfaces that allow computing device 1600 to interact with other systems, devices, or computing environments. Example interface(s)

1606 include any number of different network interfaces 1620, such as interfaces to local area networks (LANs), wide area networks (WANs), wireless networks, and the Internet. Other interface(s) include user interface 1618 and peripheral device interface 1622. The interface(s) 1606 may also include one or more peripheral interfaces such as interfaces for printers, pointing devices (mice, track pad, etc.), keyboards, and the like.

Bus 1612 allows processor(s) 1602, memory device(s) 1604, interface(s) 1606, mass storage device(s) 1608, I/O device(s) 1610, and display device 1630 to communicate with one another, as well as other devices or components coupled to bus 1612. Bus 1612 represents one or more of several types of bus structures, such as a system bus, PCI bus, IEEE 1694 bus, USB bus, and so forth.

For purposes of illustration, programs and other executable program components are shown herein as discrete blocks, although it is understood that such programs and components may reside at various times in different storage components of computing device 1600, and are executed by processor(s) 1602. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

In the above disclosure, reference has been made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, an in-dash vehicle computer, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s).

At least some embodiments of the disclosure have been directed to computer program products comprising such logic (e.g., in the form of software) stored on any computer useable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the following claims and their equivalents. The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

The invention claimed is:

1. A method comprising:
   writing, by a computer system, data from a plurality of first write requests to segments of a storage device such that, for each first write request of the plurality of first write requests, data of the each first write request is written to a first segment of the storage device corresponding to a segment offset within a logical storage volume indicated by an address of the each first write request and at a physical offset within the first segment indicated by a block offset indicated by the address of the each first write request;
   receiving, by the computer system, a first instruction to change a mode of operation with respect to the logical storage volume;
   receiving, by the computer system, a plurality of second write requests subsequent to the first instruction;
   for each second write request of the plurality of second write requests:
      writing data from the each second write request to a second segment of the storage device at a first free position from a first end of the second segment and writing metadata indicating the address of the each second write request at a first free position from a second end of the second segment;
   assigning sequence numbers to a plurality of segments of the storage device assigned to the logical storage volume, the first segment and second segment being part of the plurality of segments such that:
      a first portion of the plurality of segments assigned to the logical storage volume prior to receiving the first instruction are assigned sequence numbers corresponding to a segment offset within the logical storage volume to which each segment of the first portion of the plurality of segments corresponds; and
      a second portion of the plurality of segments assigned to the logical storage volume after receiving the first instruction are assigned sequence numbers corresponding to an order of assignment to the logical storage volume without regard to segment offsets of addresses of data written to the second portion of the plurality of segments; and
   in response to the first instruction:
      generating a block map including a plurality of entries, each address in at least a portion of the logical storage volume having a corresponding entry of the plurality of entries, wherein generating the block map comprises:
         for each address of the logical storage volume, updating an entry of the plurality of entries corresponding to the each address to indicate a segment of the storage device assigned to a segment offset indicated by the each address and a block offset indicated by the each address.

2. The method of claim 1, wherein the first instruction to change the mode of operation with respect to the logical storage volume is an instruction to create a snapshot of the logical storage volume.

3. The method of claim 1, further comprising assigning sequence numbers to the second portion of the plurality of segments starting after a highest sequence number of the first portion of the plurality of segments.

4. The method of claim 1, further comprising, for each second write request of the plurality of second write requests, updating the entry of the block map corresponding to the address of the each second write request to indicate the second segment and the first free position from the first end of the second segment to which the data from the each second write request was written.

5. The method of claim 4, further comprising:
   determining that the block map includes no entries referencing the first segment;
   in response to determining that the block map includes no entries referencing the first segment, freeing the first segment to be overwritten on the storage device.

6. The method of claim 1, further comprising receiving a second instruction prior to receiving the first instruction, the second instruction being an instruction to create a backup copy of the logical storage volume, and, in response to the second instruction:
   commence copying the logical storage volume to a backup target specified in the second instruction;
   receive an intervening write request of the plurality of first write requests after commencing copying the logical storage volume to the backup target but prior to completion of copying the logical storage volume to the backup target;
   in response to the intervening write request:
      creating a copy segment that is a copy of the first segment;
      writing data from the intervening write request to the copy segment; and
      upon completion of copying of the logical storage volume to the backup target, replacing the first segment with the copy segment.

7. The method of claim 6, further comprising modifying a header of the first segment to reference the copy segment.

8. The method of claim 6, wherein replacing the second segment with the copy segment comprises replacing a reference to the second segment in a segment map.

9. A system comprising:
one or more processing devices; and
one or more memory devices operably coupled to the one or more processing devices, the one or more memory devices storing executable code that, when executed by the one or more processing devices, causes the one or more processing devices to:
  write data from a plurality of first write requests to segments of a storage device such that, for each first write request of the plurality of first write requests, data of the each first write request is written to a first segment of the storage device corresponding to a segment offset within a logical storage volume indicated by an address of the each first write request and at a physical offset within the first segment indicated by a block offset indicated by the address of the each first write request;
  receive a first instruction to change a mode of operation with respect to the logical storage volume;
  receive a plurality of second write requests subsequent to the first instruction;
  for each second write request of the plurality of second write requests:
    write data from the each second write request to a second segment of the storage device at a first free position from a first end of the second segment and writing metadata indicating the address of the each second write request at a first free position from a second end of the second segment;
  wherein the executable code, when executed by the one or more processing devices, further causes the one or more processing devices to receive a second instruction prior to receiving the first instruction, the second instruction being an instruction to create a backup copy of the logical storage volume, and, in response to the second instruction:
    commence copying the logical storage volume to a backup target specified in the second instruction;
    receive an intervening write request of the plurality of first write requests after commencing copying the logical storage volume to the backup target but prior to completion of copying the logical storage volume to the backup target;
    in response to the intervening write request:
      create a copy segment that is a copy of the first segment;
      write data from the intervening write request to the copy segment; and
      upon completion of copying of the logical storage volume to the backup target, replace the first segment with the copy segment.

10. The system of claim 9, wherein the first instruction to change the mode of operation with respect to the logical storage volume is an instruction to create a snapshot of the logical storage volume.

11. The system of claim 9, wherein the executable code, when executed by the one or more processing devices, further causes the one or more processing devices to:
  in response to the first instruction, assign sequence numbers to a plurality of segments of the storage device assigned to the logical storage volume, the first segment and second segment being part of the plurality of segments such that:
    a first portion of the plurality of segments assigned to the logical storage volume prior to receiving the first instruction are assigned sequence numbers corresponding to a segment offset within the logical storage volume to which each segment of the first portion of the plurality of segments corresponds; and
    a second portion of the plurality of segments assigned to the logical storage volume after receiving the first instruction are assigned sequence numbers corresponding to an order of assignment to the logical storage volume without regard to segment offsets of addresses of data written to the second portion of the plurality of segments.

12. The system of claim 11, wherein the executable code, when executed by the one or more processing devices, further causes the one or more processing devices to:
  assign sequence numbers to the second portion of the plurality of segments starting after a highest sequence number of the first portion of the plurality of segments.

13. The system of claim 11, wherein the executable code, when executed by the one or more processing devices, further causes the one or more processing devices to, in response to the first instruction:
  generate a block map including a plurality of entries, each address in at least a portion of the logical storage volume having a corresponding entry of the plurality of entries, wherein generating the block map comprises:
    for each address of the logical storage volume, updating an entry of the plurality of entries corresponding to the each address to indicate a segment of the storage device assigned to a segment offset indicated by the each address and a block offset indicated by the each address.

14. The system of claim 13, wherein the executable code, when executed by the one or more processing devices, further causes the one or more processing devices to, for each second write request of the plurality of second write requests, updating the entry of the block map corresponding to the address of the each second write request to indicate the second segment and the first free position from the first end of the second segment to which the data from the each second write request was written.

15. The system of claim 14, wherein the executable code, when executed by the one or more processing devices, further causes the one or more processing devices to:
  determine that the block map includes no entries referencing the first segment;
  in response to determining that the block map includes no entries referencing the first segment, free the first segment to be overwritten on the storage device.

16. The system of claim 9, wherein the executable code, when executed by the one or more processing devices, further causes the one or more processing devices to:
  modify a header of the first segment to reference the copy segment.

17. The system of claim 9, wherein the executable code, when executed by the one or more processing devices, further causes the one or more processing devices to:
  replace the second segment with the copy segment by replacing a reference to the second segment in a segment map.

18. A system comprising:
one or more processing devices; and
one or more memory devices operably coupled to the one or more processing devices, the one or more memory devices storing executable code that, when executed by the one or more processing devices, causes the one or more processing devices to:
  write data from a plurality of first write requests to segments of a storage device such that, for each first write request of the plurality of first write requests, data of the each first write request is written to a first segment of the storage device corresponding to a segment offset within a logical storage volume indicated by an address of the each first write request and at a physical offset within the first segment indicated by a block offset indicated by the address of the each first write request;

receive a first instruction to change a mode of operation with respect to the logical storage volume;

receive a plurality of second write requests subsequent to the first instruction;

for each second write request of the plurality of second write requests:

write data from the each second write request to a second segment of the storage device at a first free position from a first end of the second segment and writing metadata indicating the address of the each second write request at a first free position from a second end of the second segment.

19. The system of claim 18, wherein the executable code, when executed by the one or more processing devices, further causes the one or more processing devices to:

in response to the first instruction, assign sequence numbers to a plurality of segments of the storage device assigned to the logical storage volume, the first segment and second segment being part of the plurality of segments such that:

a first portion of the plurality of segments assigned to the logical storage volume prior to receiving the first instruction are assigned sequence numbers corresponding to a segment offset within the logical storage volume to which each segment of the first portion of the plurality of segments corresponds; and a second portion of the plurality of segments assigned to the logical storage volume after receiving the first instruction are assigned sequence numbers corresponding to an order of assignment to the logical storage volume without regard to segment offsets of addresses of data written to the second portion of the plurality of segments.

* * * * *